US012615584B2

(12) United States Patent　　　　(10) Patent No.:　US 12,615,584 B2
　　Koshta et al.　　　　　　　　　　(45) Date of Patent:　　Apr. 28, 2026

(54) METHOD AND APPARATUS FOR ESSENTIAL SLICE SERVICE PROCESSING AND RECOVERY OF SERVICE

(71) Applicant: Apple Inc., Cupertino, CA (US)

(72) Inventors: Nirlesh Koshta, Bengaluru (IN); Sridhar Prakasam, Fremont, CA (US); Karthik Anantharaman, Cupertino, CA (US); Vijay Venkataraman, Cupertino, CA (US); Krisztian Kiss, Cupertino, CA (US); Nitin Kuppelur, Bengaluru (IN); Deepak Dash, Bengaluru (IN); Pradeep Pangi, Bengaluru (IN); Kavya B. Ravikumar, San Diego, CA (US); Xiangpeng Jing, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 17/327,158

(22) Filed: May 21, 2021

(65) Prior Publication Data

US 2021/0368435 A1　　Nov. 25, 2021

(30) Foreign Application Priority Data

May 22, 2020　(IN) ............................. 202041021590

(51) Int. Cl.
　　*H04W 48/18*　　　(2009.01)
　　*H04W 60/04*　　　(2009.01)
　　*H04W 84/04*　　　(2009.01)
(52) U.S. Cl.
　　CPC ........... *H04W 48/18* (2013.01); *H04W 60/04* (2013.01); *H04W 84/042* (2013.01)
(58) Field of Classification Search
　　CPC ..... H04W 48/18; H04W 60/00; H04W 60/04; H04W 8/18; H04W 84/042
　　See application file for complete search history.

(56) References Cited

U.S. PATENT DOCUMENTS 10,791,508 B2　9/2020　Park et al.
10,932,111 B2　2/2021　Mladin et al.
　　　　　　　　　(Continued)

FOREIGN PATENT DOCUMENTS

CN　　104219732　A　　12/2014
CN　　106102182　A　　11/2016
　　　　　　　　　(Continued)

OTHER PUBLICATIONS

3GPP TS 24.501 V16.3.0, Non-Access-Stratum (NAS) protocol for 5G System (5GS); Stage 3, Dec. 2019; 645 pages.

(Continued)

*Primary Examiner* — Golam Sorowar
*Assistant Examiner* — Nicole M Louis-Fils
(74) *Attorney, Agent, or Firm* — STERNE, KESSLER, GOLDSTEIN & FOX P.L.L.C.

(57)　　　　　　ABSTRACT

Methods and apparatuses are disclosed for requesting and providing service of a network slice deemed essential by a user equipment (UE). The UE transmits a request message to the network indicating that essential services are requested, and identifying the essential network slice. Based on the information in the request message, the serving network communicates with one or more network nodes to determine whether the requested services can be provided. This information is packaged in a response message and transmitted to the UE. If the current network is capable of servicing the requested network slice, then the UE remains with the current network. If not, then the UE initiates a search for an alternative network (PLMN or SNPN) capable of supporting the requested services. A successful search causes the UE to register with the newly-found network, whereas an unsuccessful search causes the UE to re-register with the current network.

20 Claims, 17 Drawing Sheets

(56)                    References Cited

U.S. PATENT DOCUMENTS

| | | | | |
|---|---|---|---|---|
| 2019/0357129 A1* | 11/2019 | Park | | H04W 60/04 |
| 2020/0077327 A1* | 3/2020 | Duan | | H04W 76/11 |
| 2020/0100080 A1* | 3/2020 | Mladin | | H04W 4/70 |
| 2020/0145914 A1* | 5/2020 | Jalkanen | | H04W 12/06 |
| 2020/0267513 A1* | 8/2020 | Zhu | | H04L 65/1033 |
| 2021/0112513 A1* | 4/2021 | Chun | | H04W 60/00 |
| 2022/0086743 A1* | 3/2022 | Chun | | H04W 48/18 |
| 2022/0159605 A1* | 5/2022 | Li | | H04L 67/34 |
| 2022/0240213 A1* | 7/2022 | Ly | | H04W 4/14 |
| 2022/0369215 A1* | 11/2022 | Dees | | H04W 76/12 |
| 2023/0188964 A1* | 6/2023 | Pateromichelakis | ... | H04L 67/34 |
| | | | | 709/218 |

FOREIGN PATENT DOCUMENTS

| | | | |
|---|---|---|---|
| CN | 109964509 A | 7/2019 | |
| CN | 110447247 A | 11/2019 | |

OTHER PUBLICATIONS

3GPP TS 24.368 V16.2.0, 3rd Generation Partnership Project; Technical Specification Group Core Network and Terminals; Non-Access Stratum (NAS) configuration Management Object (MO) (Release 16), Sep. 2019; 33 pages.

* cited by examiner

100

500

600

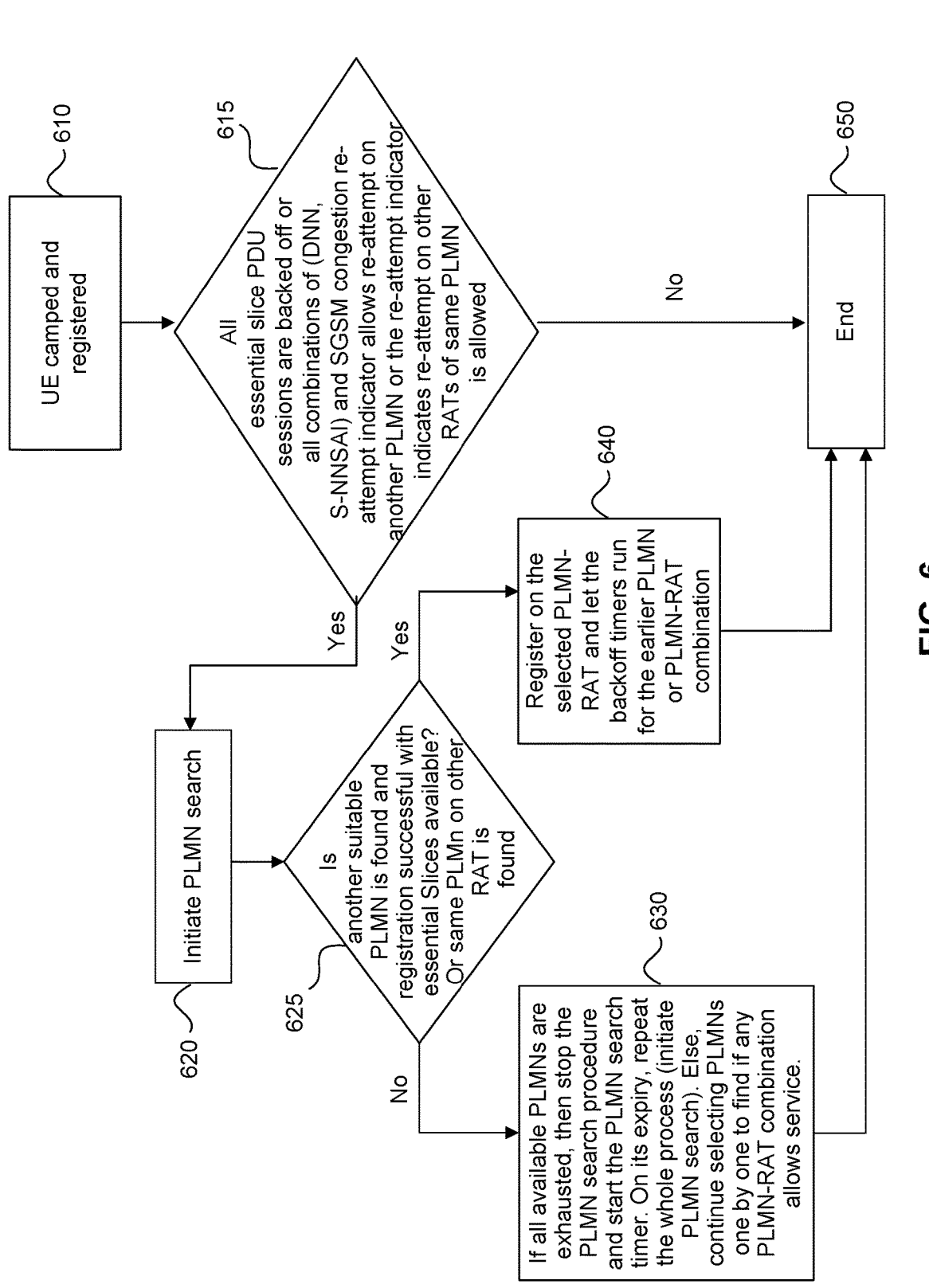

610 — UE camped and registered

615 — All essential slice PDU sessions are backed off or all combinations of (DNN, S-NNSAI) and SGSM congestion re-attempt indicator allows re-attempt on another PLMN or the re-attempt indicator indicates re-attempt on other RATs of same PLMN is allowed Yes 620 — Initiate PLMN search 625 — Is another suitable PLMN is found and registration successful with essential Slices available? Or same PLMn on other RAT is found Yes 640 — Register on the selected PLMN-RAT and let the backoff timers run for the earlier PLMN or PLMN-RAT combination No 630 — If all available PLMNs are exhausted, then stop the PLMN search procedure and start the PLMN search timer. On its expiry, repeat the whole process (initiate PLMN search). Else, continue selecting PLMNs one by one to find if any PLMN-RAT combination allows service.

No

650 — End

FIG. 6

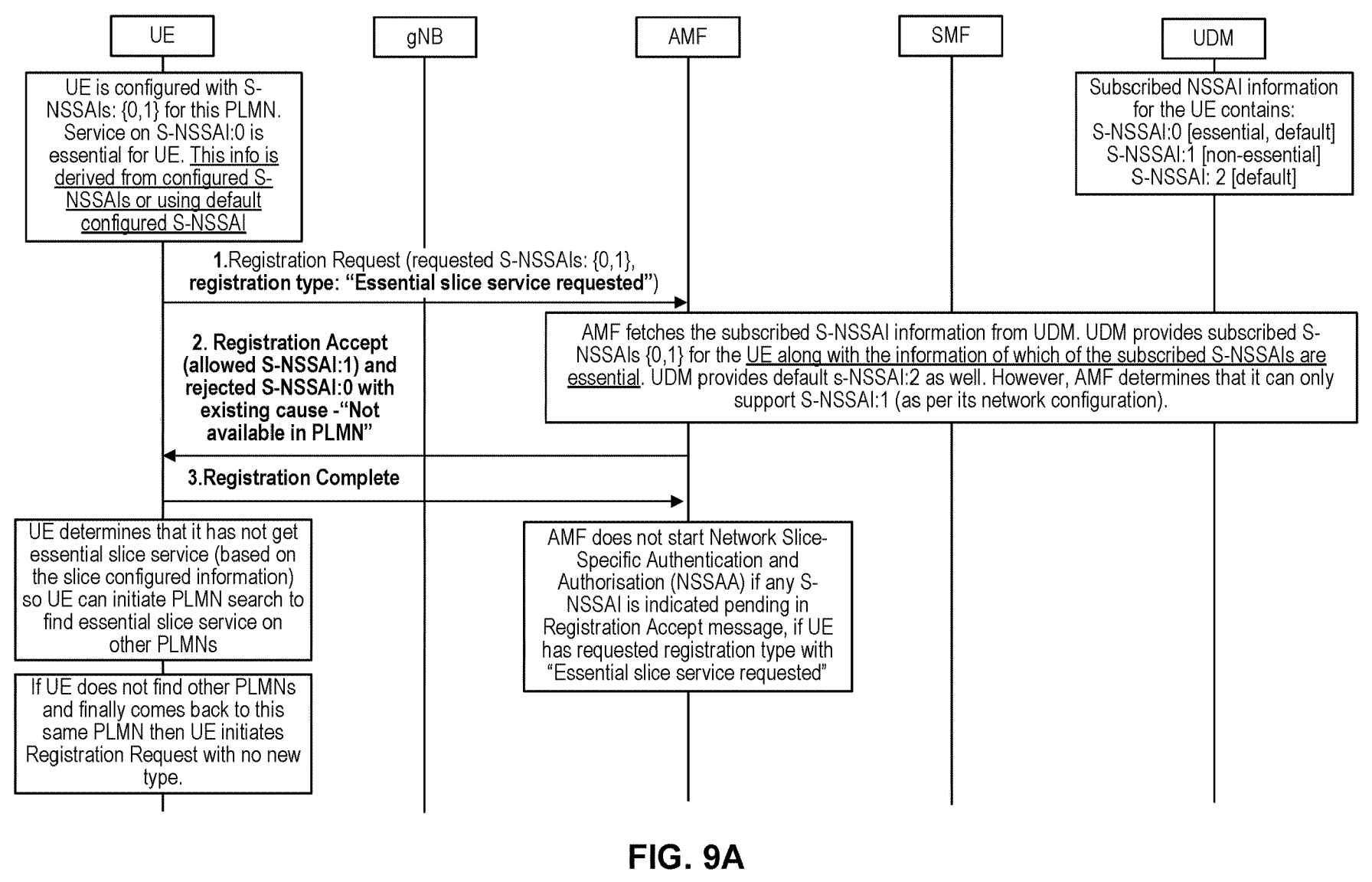

UDM

Subscribed NSSAI information for the UE contains:
S-NSSAI:0 [essential, default]
S-NSSAI:1 [non-essential]
S-NSSAI: 2 [default]

SMF

AMF

AMF fetches the subscribed S-NSSAI information from UDM. UDM provides subscribed S-NSSAIs {0,1} for the UE along with the information of which of the subscribed S-NSSAIs are essential. UDM provides default s-NSSAI:2 as well. However, AMF determines that it can only support S-NSSAI:1 (as per its network configuration).

AMF does not start Network Slice-Specific Authentication and Authorisation (NSSAA) if any S-NSSAI is indicated pending in Registration Accept message, if UE has requested registration type with "Essential slice service requested"

gNB

1.Registration Request (requested S-NSSAIs: {0,1}, registration type: "Essential slice service requested")

2. Registration Accept (allowed S-NSSAI:1) and rejected S-NSSAI:0 with existing cause -"Not available in PLMN"

3.Registration Complete

UE

UE is configured with S-NSSAIs: {0,1} for this PLMN. Service on S-NSSAI:0 is essential for UE. This info is derived from configured S-NSSAIs or using default configured S-NSSAI UE determines that it has not get essential slice service (based on the slice configured information) so UE can initiate PLMN search to find essential slice service on other PLMNs If UE does not find other PLMNs and finally comes back to this same PLMN then UE initiates Registration Request with no new type.

FIG. 9A

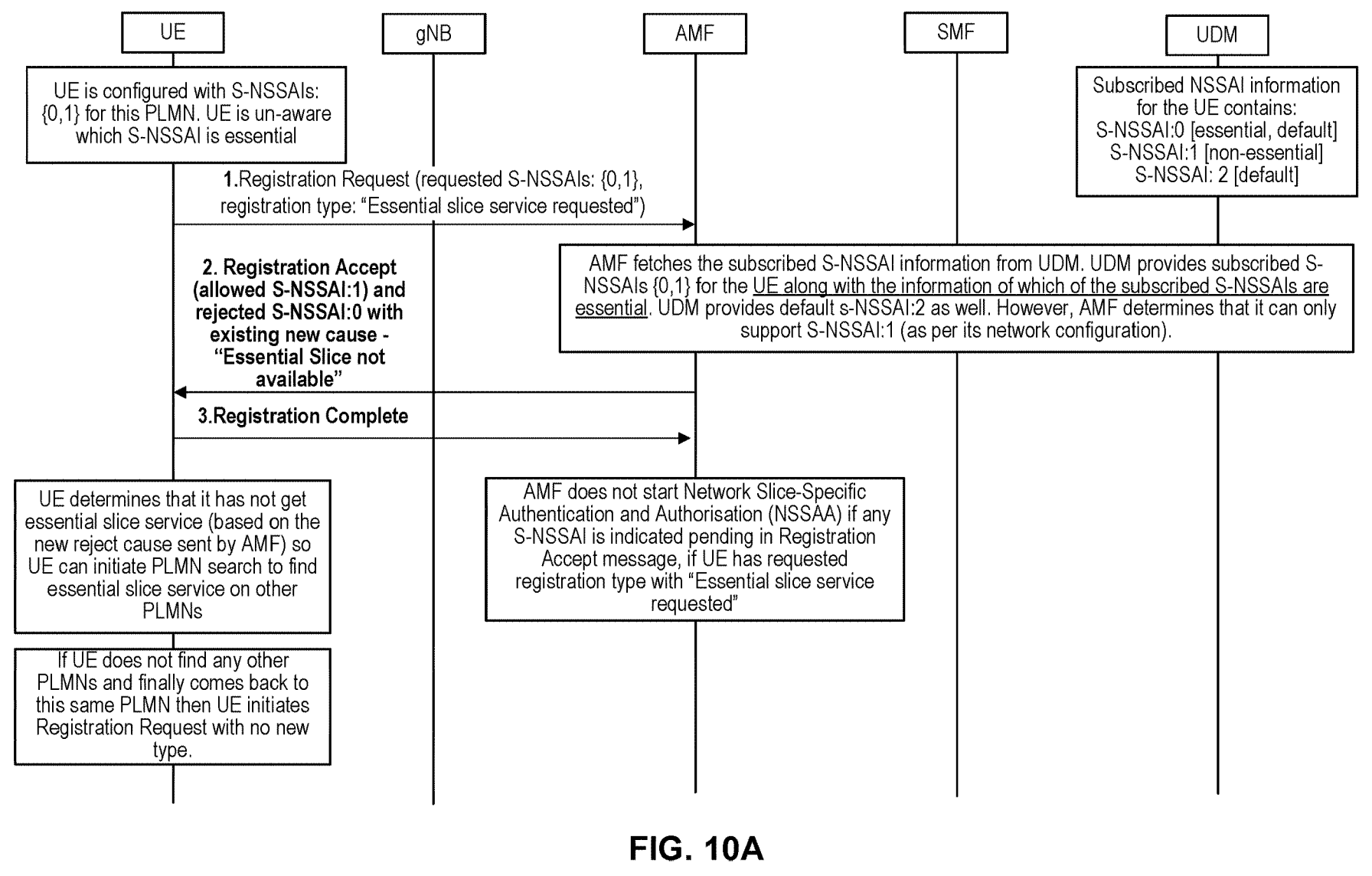

UDM

Subscribed NSSAI information for the UE contains:
S-NSSAI:0 [essential, default]
S-NSSAI:1 [non-essential]
S-NSSAI: 2 [default]

SMF

AMF

AMF fetches the subscribed S-NSSAI information from UDM. UDM provides subscribed S-NSSAIs {0,1} for the UE along with the information of which of the subscribed S-NSSAIs are essential. UDM provides default s-NSSAI:2 as well. However, AMF determines that it can only support S-NSSAI:1 (as per its network configuration).

AMF does not start Network Slice-Specific Authentication and Authorisation (NSSAA) if any S-NSSAI is indicated pending in Registration Accept message, if UE has requested registration type with "Essential slice service requested"

gNB

UE

UE is configured with S-NSSAIs: {0,1} for this PLMN. UE is un-aware which S-NSSAI is essential 1.Registration Request (requested S-NSSAIs: {0,1}, registration type: "Essential slice service requested")

2. Registration Accept (allowed S-NSSAI:1) and rejected S-NSSAI:0 with existing new cause - "Essential Slice not available"

3.Registration Complete

UE determines that it has not get essential slice service (based on the new reject cause sent by AMF) so UE can initiate PLMN search to find essential slice service on other PLMNs If UE does not find any other PLMNs and finally comes back to this same PLMN then UE initiates Registration Request with no new type.

FIG. 10A

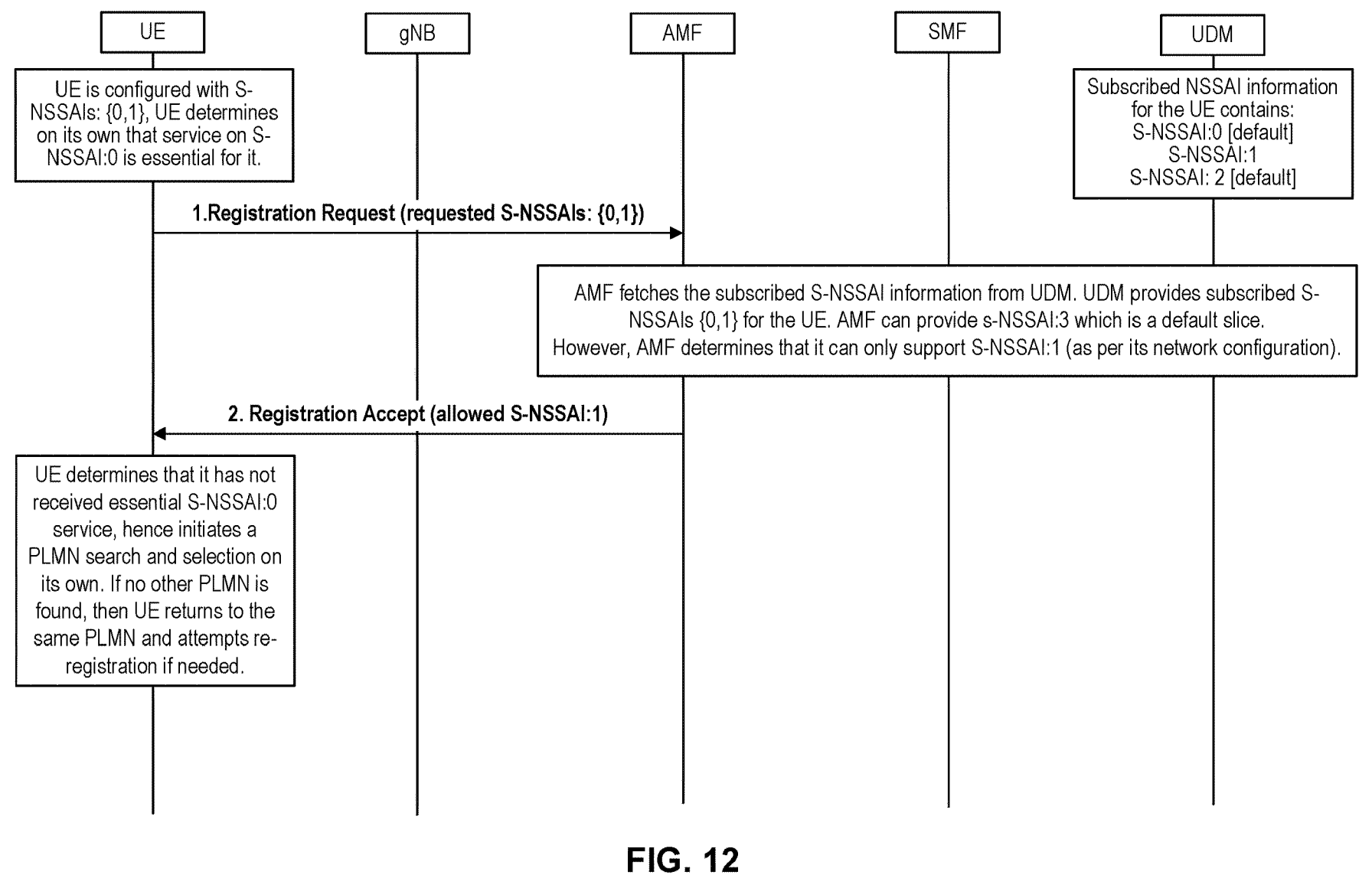

UDM

Subscribed NSSAI information for the UE contains:
S-NSSAI:0 [default]
S-NSSAI:1
S-NSSAI: 2 [default]

AMF fetches the subscribed S-NSSAI information from UDM. UDM provides subscribed S-NSSAIs {0,1} for the UE. AMF can provide s-NSSAI:3 which is a default slice. However, AMF determines that it can only support S-NSSAI:1 (as per its network configuration).

SMF

AMF gNB

1. Registration Request (requested S-NSSAIs: {0,1})

2. Registration Accept (allowed S-NSSAI:1)

UE

UE is configured with S-NSSAIs: {0,1}, UE determines on its own that service on S-NSSAI:0 is essential for it.

UE determines that it has not received essential S-NSSAI:0 service, hence initiates a PLMN search and selection on its own. If no other PLMN is found, then UE returns to the same PLMN and attempts re-registration if needed.

FIG. 12

METHOD AND APPARATUS FOR ESSENTIAL SLICE SERVICE PROCESSING AND RECOVERY OF SERVICE

CROSS-REFERENCE TO RELATED APPLICATIONS

This application claims priority to Indian Application No. 202041021590 entitled "METHOD AND APPARATUS FOR ESSENTIAL SLICE SERVICE PROCESSING AND RECOVERY OF SERVICE", filed May 22, 2020, the contents of which are hereby incorporated by reference herein in its entirety.

FIELD

Various embodiments generally may relate to the field of wireless communications.

SUMMARY

In various aspects of the disclosure, a user equipment (UE) seeks to obtain network service for an essential network slice. To this end, the UE transmits a registration request message to the network requesting service for one or more essential slices. The network, and specifically an Access and Mobility Management Function (AMF), transmits the request to a User Data Management function (UDM), which determines whether the essential slice(s) is serviceable. The UDM responds to the UE, via the AMF, as to whether the requested essential slice is serviceable on the present PLMN.

Depending on the reply received (e.g., whether the essential slice is serviceable or not), the UE can then choose to either remain with the registered public land mobile network (PLMN) (in the case of an acceptance) or can search out an alternative PLMN capable over providing the essential slice (in the case of a rejection). In various aspects of the disclosure, the UE can maintain a relation to the slice or the DNN applicable to the entire PLMN. Or there can be various combinations where the backoff timer can be running for the combination of (slice+DNN) or (no slice+DNN) or (slice+no DNN) or (no slice+no DNN) and the backoff re-attempt IE indicates re-attempt on other PLMNs is allowed or other RAT is allowed. The UE may then carry out search for other PLMNs or Radio Access Technologies RATs to find essential slice service. If no suitable PLMN or RAT is found, UE returns to the previously camped PLMN and can periodically search for better PLMNs or same PLMN other RAT if needed. If no acceptable PLMN is found before the backoff timer expires, then the UE can re-register with the registered PLMN.

Aspects of the present disclosure include a user equipment (UE) having a transceiver configured to wirelessly communicate with a network; and one or more processors. The processors are configured to carry out a number of functions of the UE, such as identifying a network slice as essential; causing the transceiver to transmit a request message to the network that identifies the essential network slice; receiving a response message from the network indicating whether the essential network slice is serviceable by the network; and initiating a network search for a supporting network that supports the essential network slice based on the received response message.

Aspects of the present disclosure include a method for seeking service for an essential network slice by a UE. The method includes determining that a network does not support an essential slice sought by the UE; determining that the UE is not camped on the network; initiating a search for a second network capable of supporting the essential slice; and tracking a backoff timer during the search.

Aspects of the present disclosure include a method for seeking service for an essential network slice. The method includes identifying the essential network slice; transmitting a request message to a network that identifies the essential network slice; receiving a response message from the network indicating whether the essential network slice is serviceable by the network; and initiating a network search for a supporting network that supports the essential network slice based on the received response message.

Aspects of the present disclosure include a base station that includes a transceiver configured to communicate with a user equipment (UE) and a network element and one or more processors configured to carry out various functions of the base station. For example, the one or more processors receive a request message from the UE that identifies an essential network slice; cause the transceiver to request service availability of the essential network slice from the network element; receive a response message from the network element indicating whether the essential network slice is supported; and cause the transceiver to transmit the response message to the UE.

In aspects of the disclosure, the request message includes a single bit indicating whether essential services are requested.

In aspects of the disclosure, the request message is a REGISTRATION REQUEST message, and the response message is one of a REGISTRATION ACCEPT or a REGISTRATION REJECT message.

In aspects of the disclosure, the one or more processors are configured to interpret the REGISTRATION ACCEPT message as indicating that the network is capable of servicing the essential network slice.

In aspects of the disclosure, the one or more processors are configured to interpret the REGISTRATION REJECT message as indicating that the network is not capable of servicing the essential network slice, wherein the network search is initiated in response to the REGISTRATION REJECT message.

In aspects of the disclosure, the network search searches for at least one of a Public Land Mobile Network (PLMN) or a Stand-alone Non-Public Network (SNPN) capable of servicing the essential network slice.

In aspects of the disclosure, the one or more processors are configured to receive a CONFIGURATION UPDATE COMMAND that indicates a change in support for the essential slice.

In aspects of the disclosure, the UE receives the backoff timer from the network.

In aspects of the disclosure, the search is performed until the second network capable of supporting the essential slice is found, or until the backoff timer expires.

In aspects of the disclosure, the UE re-registers with the network in response to the expiration of the backoff timer.

In aspects of the disclosure, the UE transmits a REGISTRATION REQUEST message to the network that includes at least one bit indicating "all services requested."

In aspects of the disclosure, the second network is one of a Public Land Mobile Network or a Stand-alone Non-Public Network.

In aspects of the disclosure, request message received by the base station includes a single bit indicating whether essential services are requested.

In aspects of the disclosure, the network element is an Access and Mobility Management function (AMF).

In aspects of the disclosure, the one or more processors of the base station are further configured to receive a CONFIGURATION UPDATE COMMAND from the network element indicating a change in support for the essential slice; and forward the received CONFIGURATION UPDATE COMMAND to the UE.

In aspects of the disclosure, the one or more processors of the base station are further configured to receive a DOWNLINK NAS TRANSPORT with payload containing—"UE parameters update transparent" container from the network element indicating a change in support for the essential slice, and forward the received DOWNLINK NAS TRANSPORT to the UE.

In aspects of the disclosure, the one or more processors of the base station are further configured to determine, based on information included in the request message, an Access Mobility Management Function to which the request will be forwarded.

BRIEF DESCRIPTION OF THE FIGURES

FIG. 6 illustrates a flowchart diagram of an exemplary method for searching for an essential slice supporting network according to an aspect;

FIGS. 9A-9B illustrate an exemplary message flow diagram of a UE maintaining information about essential network slices according to aspects of the present disclosure;

FIGS. 10A-10B illustrate an exemplary message flow diagram for requesting and searching for an essential network slice according to aspects of the present disclosure;

FIG. 12 illustrates an exemplary message flow diagram for a UE determining that essential slice service is not available and initiating a PLMN search according to aspects of the present disclosure;

DETAILED DESCRIPTION

Figure 1:
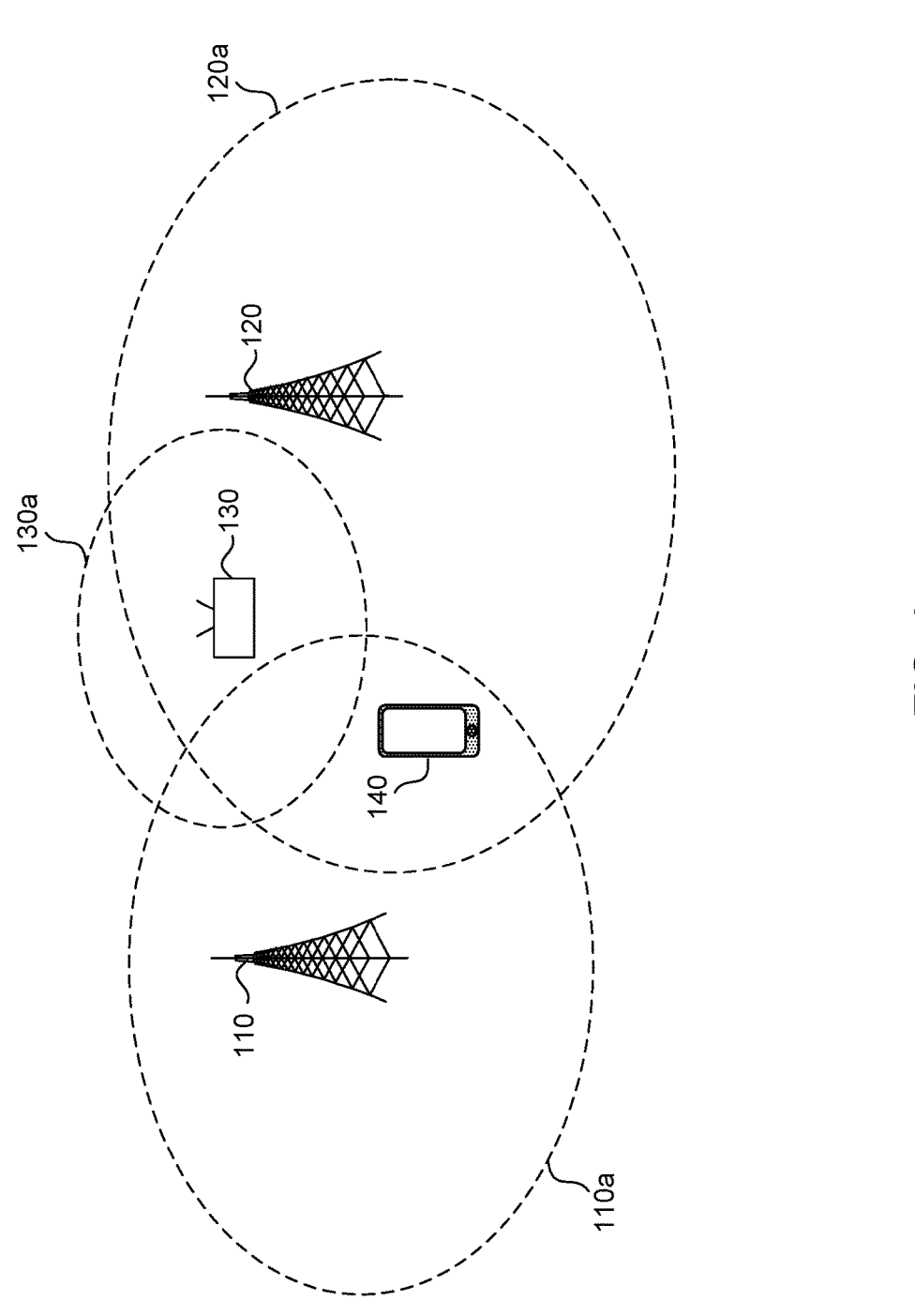
FIG. 1 illustrates an exemplary wireless communication environment according to an embodiment.

Network slicing is an important capability to bring network resource utilization efficiency, deployment flexibility and support fast growing over the top (OTT) application and services. A network slice is viewed as a logical end-to-end network that can be dynamically created, and is a portion of a larger access network capabilities. A given User Equipment (UE) may have access to multiple slices over the same access network (e.g., over the same radio interface). But each slice may serve a particular service type with agreed upon Service-level Agreement (SLA). In some instances, a UE may identify a particular network slice, of multiple available slices, as "essential." However, a Public Land Mobile Network (PLMN) may not provide service for this network slice. This can cause multiple problems.

For example, it may occur in 5G that the UE remains camped on a Visited Public Land Mobile Network (VPLMN) that does not provide services on a necessary slice. In other words, a requested essential slice is rejected for the entire camped VPLMN or current registration area. However, the VPLMN nonetheless provides service on other requested slices or a default slice not requested by the UE. Essential slice services can include any preferred slice depending on the type of device. For example, a Vehicle to Everything (V2X) UE may be configured for a V2X slice and an enhanced Mobile Broadband (eMBB) slice. A given VPLMN may provide neither slice, or may provide one but not the other. If the UE deems that both are important (e.g., essential), the UE may seek out an alternative VPLMN capable of supporting all essential slices.

In a first example, the UE requests slices 0 and 1 and the network provides service on slice 1, but does not serve slice 0. However, slice 0 service is an essential slice to the UE. According to current 3GPP specifications, the UE continues to stay on the same PLMN for slice 1 service, at the cost of the essential slice 0 service.

In another example, the UE requested slice 0 and the network provided slice 1 (default Single Network Slice Selection Assistance Information [S-NSSAI]) in a REG ACCEPT message, and he network did not send any indication that available network slices have changed. As a result, the UE may be forced to stay on the camped PLMN where it does not have essential slice services.

Another problem may occur in 5G where all UE requested slices or an essential slice or data network name (DNN) are backed off for a current VPLMN, and 5G session management (5GSM) congestion reattempt information element (IE) on other PLMNs is allowed. In this case, the UE continues to remain camped on the same 5G PLMN and run the backoff timers for the PLMN/DNN/S-NSSAI combination. During this time, the UE will not be able to get service on essential slice service when it can be possible for the UE to find it on other PLMNs.

To provide an example, UE requested essential slices in 5G are backed off for cause (e.g., #67: insufficient resources for specific slice and DNN; #69: insufficient resources for specific slice, etc.). Meanwhile, 5GSM congestion re-attempt indicator IE indicates that attempts on other PLMNs is allowed. with the network provides T3585 value as the duration of the back-off timer value. T3585 and T3584 timer values can range from 2 seconds to 320 hours. Typically, the network will provide the timer value on the order of minutes (e.g., 15-30 minutes), but higher timer values are possible, resulting in extended wait times to use an essential slice.

In still a further problem, there may be situations in 5G where all UE requested slices or an essential slice or DNN are backed off for a current PLMN and the re-attempt indicator IE indicates that re-attempt on S1 (LTE) is allowed. In these situations, the UE continues to remain camped on the same 5G PLMN and run the backoff timers associated with the PLMN/DNN/S-NSSAI combination. During this time, the UE will not be able to get essential slice service when it can be possible for the UE to find service on LTE with the given Quality of Service (QoS) requirements for the essential slice.

Here, once again, the UE requested slices in 5G are backed off for cause (e.g., #26: insufficient resources; #67: insufficient resources for specific slice and DNN; or #69: insufficient resources for specific slice, etc.), with back-off timer and re-attempt indicator IE indicating attempt on S1 mode allowed or UE derives that it can attempt the requested service on LTE. In this instance, according to the 3GPP specification, the UE does not attempt to select LTE on its own, but rather applies normal cell selection and re-selection to camp on LTE. Only then, the UE will attempt to register and receive service for the specific backed off slice/PDU session. Once again, the back-off timer values can range from 2 seconds to 320 hours. Although the network will typically provide the timer value on the order of minutes (e.g., 15-30 minutes), higher timer values are possible.

The present disclosure provides solutions to the above problems. For example, as disclosed in further detail below, a UE may include information describing the essential slice in a registration request to the network, and will receive a response from the network indicating whether the essential slice can be serviced by that network. If it cannot, then the UE will search other PLMNs for essential slice service. These, and other aspects of the present disclosure, are described herein with respect to the figures.

FIG. 1 illustrates an exemplary wireless communication environment 100 according to an embodiment. The environment 100 includes base stations 110 and 120, each having respective coverage areas 110a and 120a. In an embodiment, the base stations 110 and 120 are gNodeBs, eNodeBs, or another network-connected access point. The base stations 110 and 120 are connected to the network backend, and provide cellular connectivity to devices within their respective coverage areas.

An access point 130 may also be disposed in the environment 100, and include its own coverage area 130a. The access point can be any other type of transmission and reception point (TRP), such as a macro-cell, small cell, pico-cell, femto-cell, remote radio head, relay node, etc. Together, the base stations 110 and 120 and the access point 130 provide a network of cellular connectivity to UEs in environment 100. One such UE 140 is illustrated as being within the coverage area 110a of base station 110 and coverage area 120a of base station 120. In operation, a serving base station 110/120 and/or access point 130 will communicate with the UE 140 in order to configure full power transmission.

Figure 2:
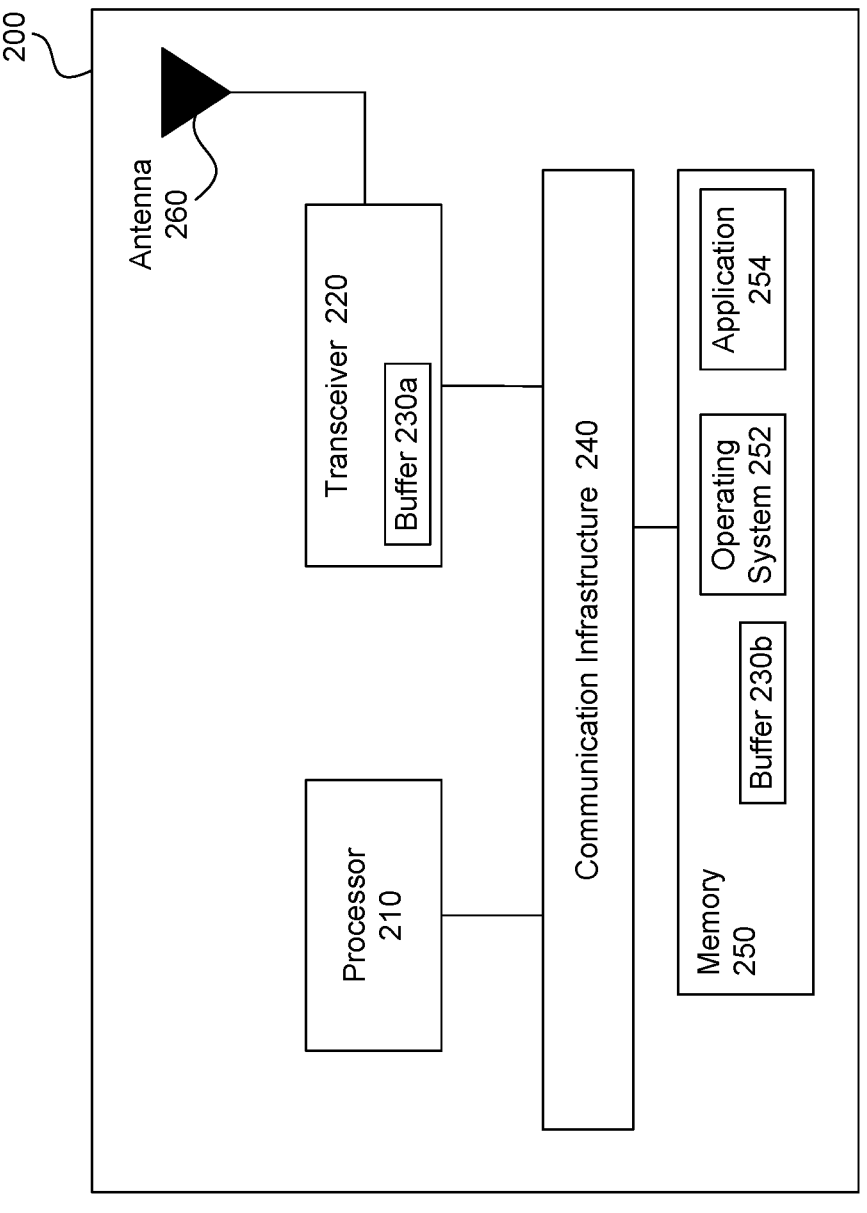
FIG. 2 illustrates a block diagram of an exemplary user equipment according to an embodiment.

FIG. 2 illustrates a block diagram of an example wireless system 200 of an electronic device implementing the measurement signal collision resolution, according to some embodiments of the disclosure. System 200 may be any of the electronic devices (e.g., AP 1010, STA 1020) of environment 100, including UE 140. System 200 includes processor 210, transceiver 220, buffer(s) 230a and 230b, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, measurement collision resolution, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 to seek out service for essential slices.

Transceiver 220 transmits and receives communications signals that support the essential slice service, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, carries out the essential slice service processing. For example, system 200 is configured to generate and send device capabilities to the network, and to receive and implement transmission power configurations from the network, as will be discussed in further detail below.

According to some embodiments, processor 210, alone or in combination with transceiver 220 and/or memory 205 can transmit the UE capabilities. Processor 210, alone or in combination with transceiver 220 and/or memory 205, can receive and implement essential slice requesting and network searching.

Essential Slice Service

In one aspect, the 3GPP specification may be modified to introduce the concept of an essential slice. The network may define only one essential slice or more than one. However, defining only one essential slice simplifies its handling by the UE and the network.

Figure 3:
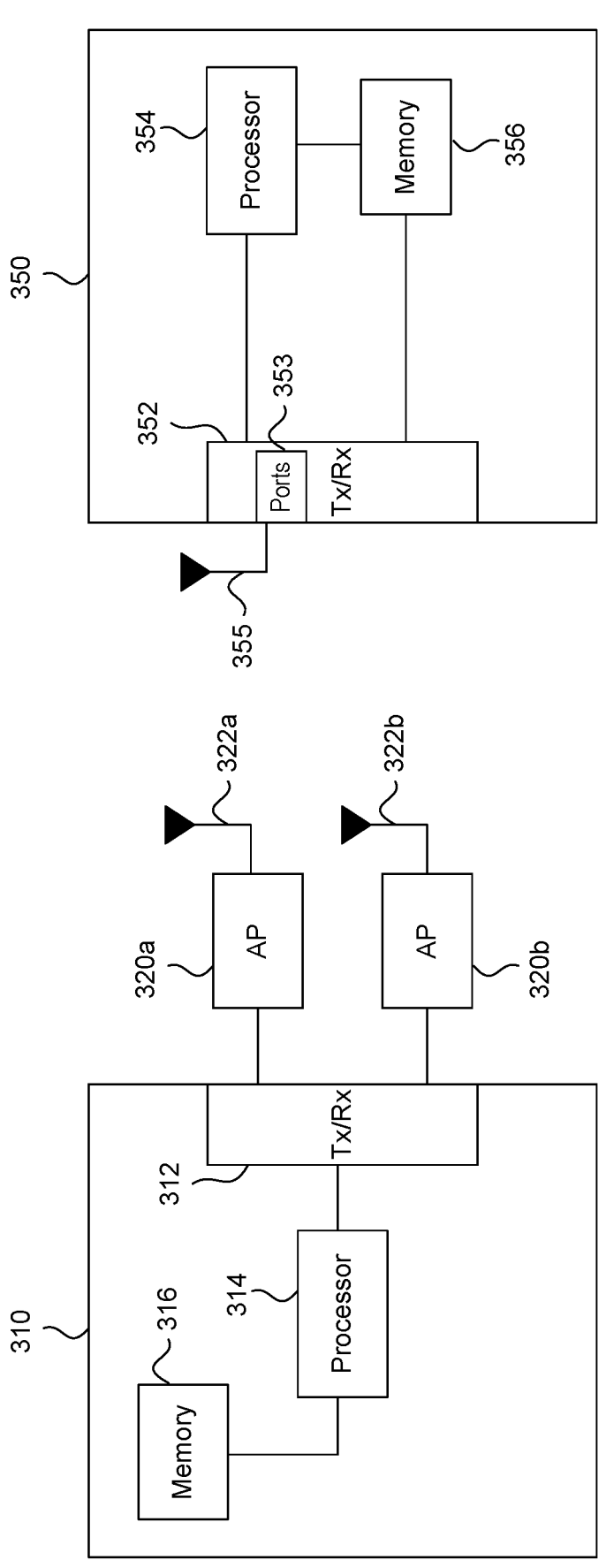
FIG. 3 illustrates a functional block diagram of an exemplary wireless communication environment according to an embodiment.

FIG. 3 illustrates a functional block diagram of an exemplary wireless communication environment 300 according to an embodiment. The environment includes a plurality of access points 320 that provide wireless connectivity from the network backend 310 to a UE 350. In an embodiment, the access points 320 correspond to any of base stations 110 or 120, and UE 350 corresponds to UE 140 of FIG. 1. For purposes of explanation, only relevant functional blocks of the network 310 and the UE 350 are illustrated.

As shown in FIG. 3, the UE 350 includes a transceiver 352 connected to an antenna 355. The transceiver 352 includes a number of logical ports 353. A processor 354 is connected to the transceiver 352 and carries out most processing in the UE 350. The processor is also connected with a memory 356.

As shown in FIG. 3, the network 310 includes a transceiver 312 that sends and receives information with the access points 320a and 320b. Although only two connected access points are illustrated, it should be understood that the network 310 can connect with any number of access points 320. The network backend 310 includes a processor 314 that is connected with the transceiver 312. A memory 316 is connected to the processor 314. Although illustrated as separate components, it should be understood that the functional blocks can be implemented separately or integrated with each other in any combination.

In accordance with the above embodiment, the processor 354 of the UE 350 accesses the memory 356 to access essential slice information, and determines whether any network slices are considered to be essential. In various aspects, this determination can be based on device capabilities or current functionality. The processor identifies at least one essential slice desired by the UE and causes the transceiver 352 to transmit essential slice information indicative thereof to the network 310 via the antenna(s) 355. In an aspect, the essential slice information is transmitted in a REGISTRATION REQUEST message. The message is received by one or more of the access points 320, and forwarded to the network 310. The network receives the capabilities via the transceiver 312. The processor 314 decodes the received information in order to identify the essential slice requested by the UE. Slice servicing 318 then determines whether the requested essential slice is serviceable. In various aspects, this determination may be carried out by signaling the request to a UDM or other network element. Depending on whether the essential slice is serviceable, the processor 314 prepares an appropriate response to the UE. The processor 314 then causes the transceiver 312 to forward the response to the access point(s) 320, which forwards the message to the UE 350.

The transceiver 352 of the UE 350 receives the response via its antenna(s) 355, and forwards it to the processor 354. The processor 354 extracts the relevant information from the response (namely, whether the network is capable of servicing the essential slice). Depending on whether the request was accepted or rejected, the processor 354 then causes PLMN searching to be carried out so as to find a PLMN capable of supporting the essential slice.

Figure 4:
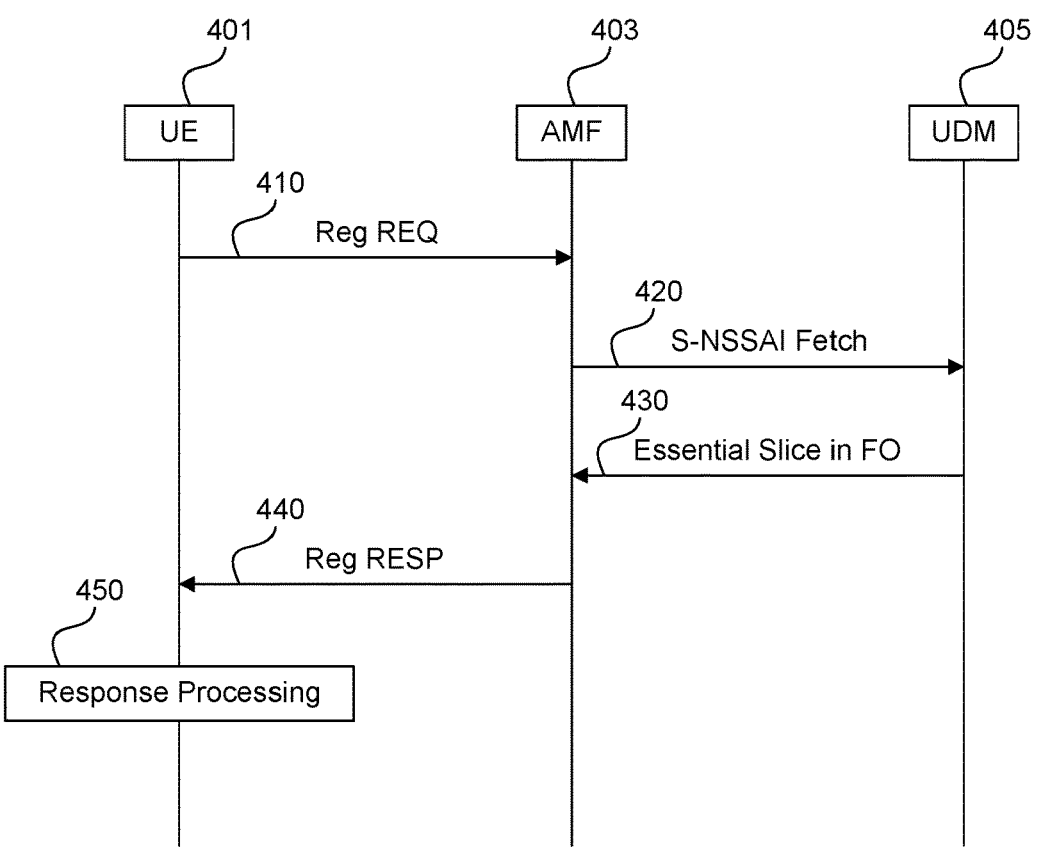
FIG. 4 illustrates a signal flow diagram of an exemplary essential slice signal flow according to an aspect of the disclosure.

FIG. 4 illustrates a signal flow diagram of an exemplary essential slice signal flow according to an aspect of the disclosure. As shown in FIG. 4, communications occur between a UE 401 and an Access and Mobility Management Function (AMF) 403, and between the AMF and a Unified Data Management (UDM) 405. In order to carry out essential slice processing, the UE transmits a request message 410 (e.g., REGISTRATION REQUEST) containing an information bit indicating that essential services are requested. In an aspect, the information bit is newly-defined in the 3GPP specification. In an alternative aspect, the essential service information can be provided by the UE in requested Single Network Slice Selection Assistance Informations (S-NSSAIs) for each slice. In others words, the UE may request multiple slices, where each slice has an associated information bit that identifies whether the slice is essential to the UE. In alternative aspects of disclosure, the UE may be configured with only default essential slices, or a separate NSSAI for maintaining the essential slice information or the UE may not have any information of the essential slice but the network maintains this information.

After receiving the request from the UE 401, the AMF 403 fetches the subscribed S-NSSAIs from the UDM 405. Specifically, the AMF transmits the fetch 420 to the UDM 405, which replies with essential slice information 430 for the UE 401, along with the subscribed S-NSSAIs. The AMF 403 then reports this information to the UE 401. In various aspects, this information can be reported via a REGISTRATION ACCEPT message if the request was successfully completed, or a REGISTRATION REJECT message if it was denied. If slice availability changes after the REGISTRATION ACCEPT or REGISTRATION REJECT messages have been sent, a CONFIGURATION UPDATE COMMAND can be sent to report the change. The latter message can be used regardless of whether the essential slice service is available. However, this will cause the UE 401 to trigger a PLMN or SNPN search in accordance with 23.122 of the 3GPP specification, if the previously supported essential slice is no longer supported.

In an alternative aspect, during the registration procedure, if the AMF 403 determines that it cannot serve the UE 401 for any of the essential S-NSSAIs for the UE 401, then it can send a new cause (have a new number #XX), titled "No essential network slices available." In this case, the network can provide a response message 440 with this new cause in the REGISTRATION ACCEPT, REGISTRATION REJECT, or CONFIGURATION UPDATE COMMAND for each S-NSSAI.

Upon receiving the response 440 from the AMF 403, the UE 401 carries out response processing 450. This processing changes depending on the type of response received from the AMF. For example, upon receiving the newly-defined cause #XX, the UE 401 determines whether a PLMN search is needed, and whether camping and registering on other PLMNs in N1 mode is necessary. For example, the UE 401 need not search on N1 for any PLMN, and may instead only attempt PLMN search on 4G/3G/2G RATs or non-3GPP over 4G. If no other suitable PLMN is found where the UE 401 can receive the essential slice services, then the UE 401 will return to camp on any of the PLMN which had reported a maximum number of slice services during the above-described process.

When the UE 401 returns to the PLMN which had reported a maximum number of slice services, the UE 401 will initiate the REGISTRATION REQUEST containing a new information indicating "all services requested." In response, the serving AMF 403 issues a REGISTRATION ACCEPT message that includes the allowed S-NSSAIs which will include non-essential slices. Thereafter, the UE 401 can optionally periodically perform a search for essential slice service in other PLMNs or SNPNs.

In this aspect, any change in allowed, default configured, configured, or rejected S-NSSAIs for the camped PLMN may cause the UE to attempt REGISTRATION REQUEST with the new information bit indicating "essential services requested" or cause the UE to perform PLMN or SNPN search.

The network may also share the essential slice type information with the UE. In order to do this, the AMF will indicate new information regarding the type of slice available. In various aspects, this information will be conveyed via a single bit that indicates whether a particular S-NSSAI is an essential slice or not. This can be indicated for each S-NSSAI in configured, default configured, or allowed S-NSSAI information sent by the network in the REGISTRATION ACCEPT or CONFIGURATION UPDATE COMMAND messages.

When sending any initial NAS signaling message (e.g., the REGISTRATION REQUEST message), the UE indicates the essential slice type information along with the S-NSSAI information to the gNB in the RRC connection establishment procedure. The gNB then uses this information to decide to which AMF the REGISTRATION REQUEST message should be forwarded.

In some aspects of the disclosure, the UE can be configured only with essential slices in the default configured NSSAI by the home network using the DL NAS TRANSPORT message containing UE parameters update transparent container. In still another aspect of the disclosure, a new essential type slice is defined. It is termed as "essential NSSAI" or "essential S-NSSAI". Essential S-NSSAI is the same across PLMNs and can get updated by Home Network only using DL NAS TRANSPORT message with a payload containing UE parameters update transparent container. Using the DL NAS TRANSPORT message with UE parameters update transparent container provides for a secure way to update the essential slice information to UE from the home network.

Figure 5:
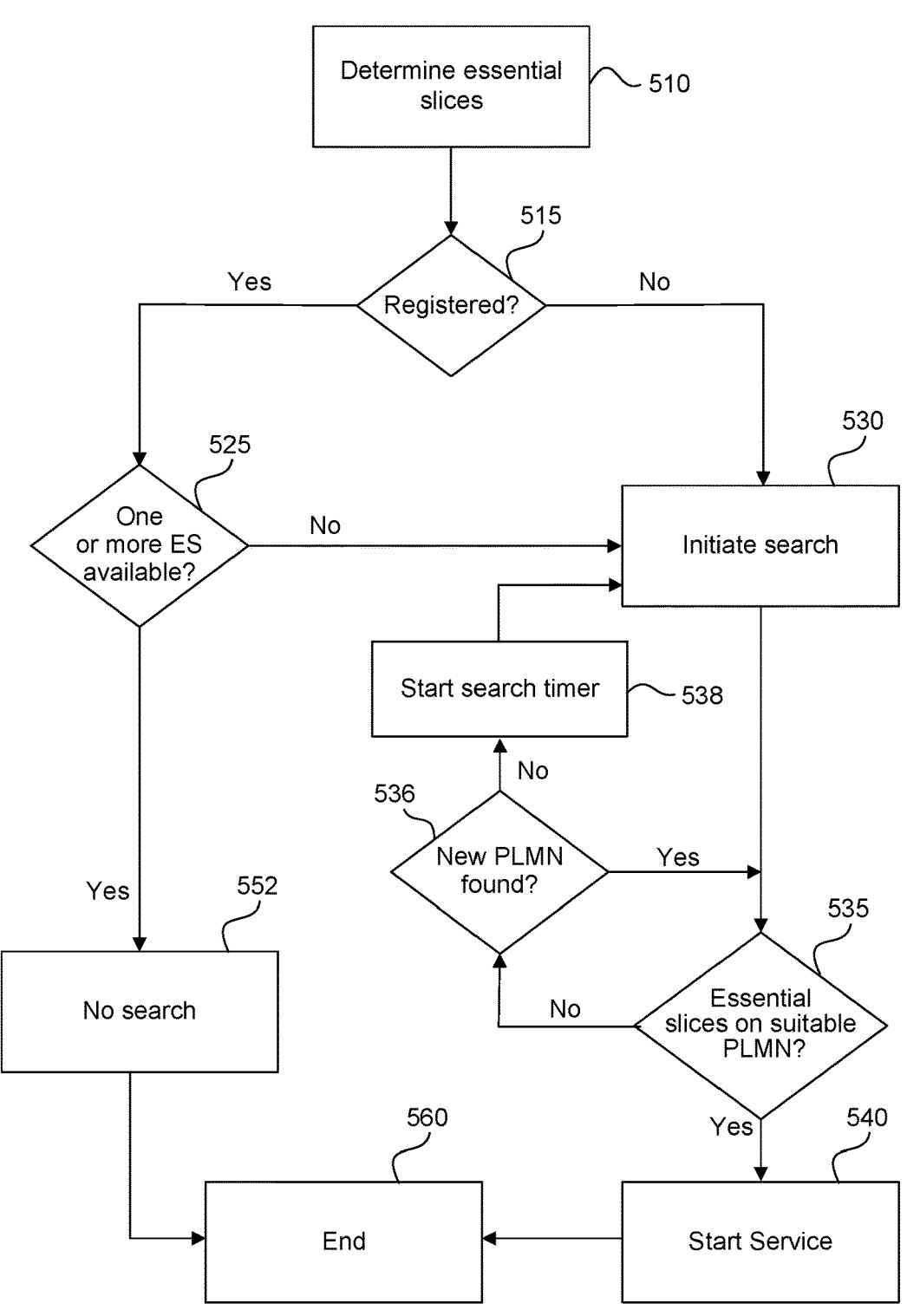
FIG. 5 illustrates a flowchart diagram of an exemplary method for seeking out essential slice service according to an aspect.

In another aspect of the present disclosure, rather than modifying the 3GPP specification, essential slice processing can be handled primarily by the UE. This is illustrated, for example, in FIG. 5, which shows a flowchart diagram of an exemplary method 500 for seeking out essential slices by a UE. Specifically, the UE may determine on its own whether one or more slices that are essential to it (510). In various aspects of the disclosure, this determination may be based on a change in essential slice information detected using other means (e.g., pre-configured in the device or based on previous history). If the UE is registered in a PLMN and essential services are not available (515—No), then the UE can initiate a PLMN or standalone Non-Public Network (SNPN) search (530) in order to find a next best PLMN, as defined in 23.122 of the 3GPP specification.

When a PLMN or SNPN is found, the UE performs a registration procedure on the newly found network (e.g., VPLMN 2) and verifies whether the network is suitable (e.g., whether the PLMN provides all service for all essential slices) (535). If the essential slice is not available (535—N), then the UE continues the search for a suitable PLMN (536). If such a PLMN is found (536), the UE once again performs the registration procedure to determine whether the PLMN provides all essential slices (535). If the search exhausts the available PLMNs without finding one that services the essential slices (536—No), then the UE camps on the PLMN having the maximum number of slices available and starts a search timer (538). When the search timer expires (538), the UE can initiate a new search (530) for a suitable PLMN or SNPN that provides essential slice service. On the other hand, if the registration procedure reveals that the requested essential slice is supported, then the UE continues its operation on the new PLMN/SNPN (540). In an aspect, the UE initiates a PDU session establishment procedure for the PDU session associated with the essential slice, and verifies that the network accepts the UE request.

On the other hand, if the UE is camped (515—Yes), then the UE determines whether one or more essential slices are supported on the PLMN (525). In an aspect of the disclosure, the UE may instead determine whether all essential slices are supported on the PLMN. If they are not (525—N), then the UE may initiate the PLMN/SNPN searching procedure described above (steps 530-540). Alternatively, if all essential slices are available on the PLMN (525—Y), then the UE concludes that no PLMN/SNPN search is needed (550). Thereafter, the method ends (560).

In another aspect of the present disclosure, the UE tracks a backoff timer for registration purposes. This is illustrated, for example, in FIG. 6, which discloses a method 600 for searching for an essential slice supporting network. As shown in FIG. 6, The UE is camped and registered on a PLMN (610). Thereafter, a determination is made as to whether all essential slice PDU sessions are backed off or all combinations of DNN/S-NSSAI and SGSM congestion reattempt indicator allows reattempt on another PLMN or the reattempt indicator indicates reattempt on other RATs of the same PLMN is allowed (615). There are a variety of possible combinations of DNN/N-SSAI, including: 1) DNN+S-NS-SAI; 2) No DNN+S-NSSAI; 3) DNN+No S-NSSAI; and 4) No DNN+No S-NSSAI. Based on this, if all such combinations get backed off for an essential slice, then the UE determines it needs to do a PLMN search if the reattempt indicator provided by the network allows for service to be received on another PLMN. Only then is a PLMN search carried out. Therefore, if 615 is satisfied (615—Yes), then the UE initiates a PLMN search (620). If not (615—No), the method ends (650).

After the search has been initiated, a determination is made as to whether another suitable PLMN is found, and whether registration with essential slices has been successful, or alternatively whether a same PLMN on a different RAT has been found (625). If yes (625—Yes), then the UE registers on the selected PLMN-RAT and allows the backoff timers to run for the earlier PLMN or PLMN-RAT combination (640). On the other hand, if no such PLMN was found (625—No) and all available PLMNs are exhausted, then the UE stops the PLMN search procedure and starts the PLMN search timer. On the expiration of the PLMN search timer, the UE re-initiates the PLMN search. Otherwise, the UE continues selecting PLMNs one by one to find if any PLMN-RAT combination allows service (630).

If the answer to 615 is "No" (615—No), or after steps 630 or 640 have completed, the method ends (650).

In another aspect of the present disclosure, depending on certain condition, the UE can disable N1 mode capabilities and attempt camping and registration on the same PLMN on long-term evolution (LTE) radio access technology (RAT). The first condition is that the UE determines that it has one or more backoff timer running for essential slice service. Additionally, a re-attempt indicator IE sent by the network indicates that attempt on S1 mode is allowed, or the UE derives that it can attempt the requested service on LTE using the EF_NASCONFIG or SM_RetryAtRATChange when it is camped on Equivalent (E)HPLMN. Provided these conditions are met, the UE can disable N1 mode capabilities and attempt camping and registration on the same PLMN on LTE RAT.

In this instance, the UE keeps the backoff timer running. When the backoff timer expires, and the UE returns to an idle mode, the UE can enable N1 mode and initiate activation of the previously backed off services on 5G.

The essential slice solutions proposed above provide several benefits over the traditional 3GPP handlings. For example, by carrying out PLMN searching, as described above, the UE performs a best effort to find service for the essential slice in other PLMNs or a same PLMN LTE RAT. Additionally, user experience is improved by having service at all times on other PLMNs or on the same PLMN and another RAT because scenarios in which the UE is stuck with no essential slice service are removed. Further, the LTE RAT may be less loaded, and can thus become a preferred option for the network as well as the UE to allow the UE to select and remain on LTE until the slice specific congestion is completed.

An additional benefit from the present disclosure is that the UE may camp first on a lower priority PLMN and receive congestion with back off timers for requested network slices. This can delay the UE from searching higher priority PLMNs or similar priority PLMNs. Further still, Release 17 of the 3GPP specification enhanced Network Slicing handling will bring in the concept of backoff for a slice when a maximum number of UEs, or support of a maximum number of PDU sessions, is reached at the network. However, the present disclosure accounts for these configurations, and thus will result in better user experience once Rel-17 enhancements are introduced in 3GPP specifications.

Figure 7:
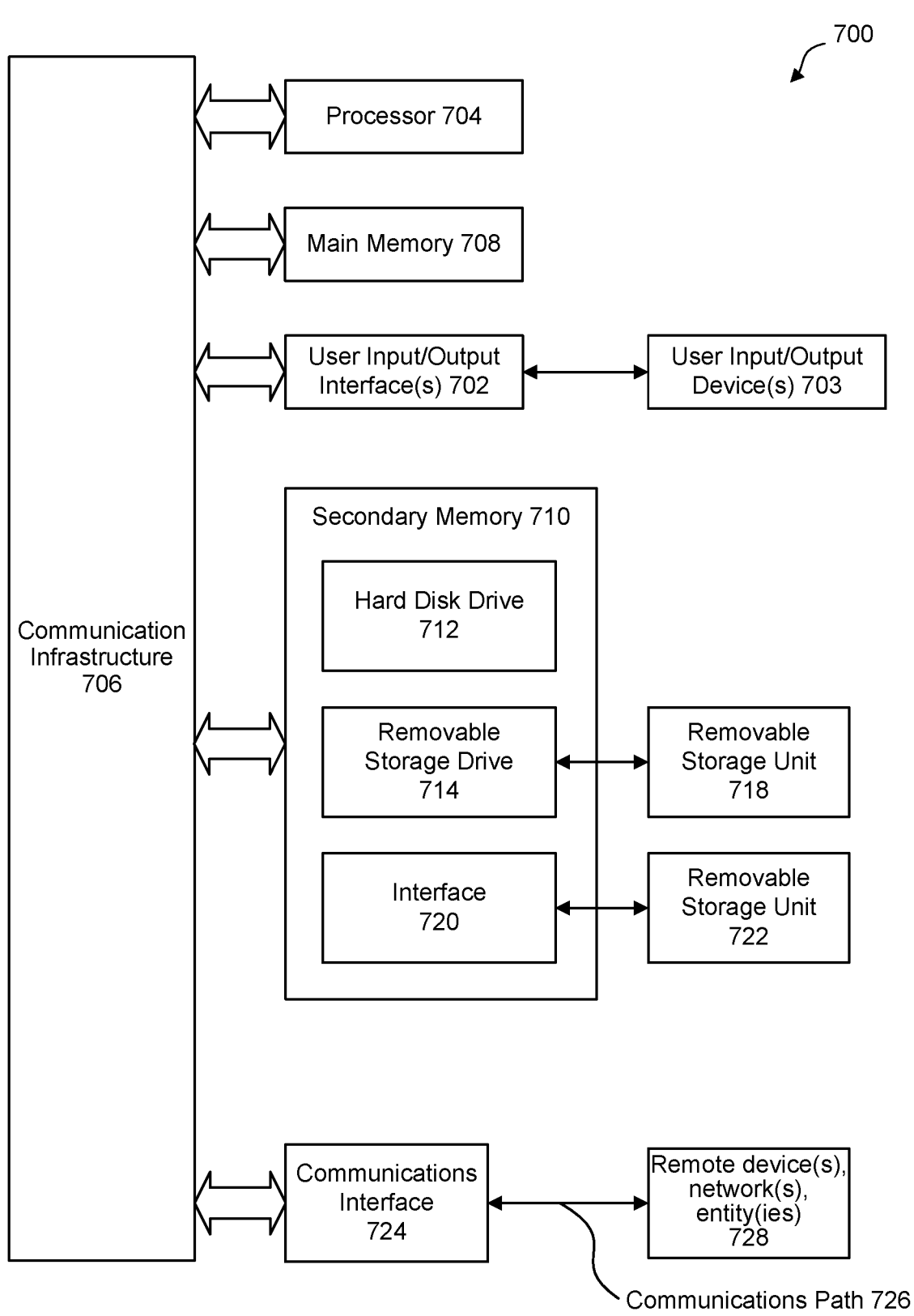
FIG. 7 illustrates a block diagram of an exemplary generic computer system capable of implementing certain aspects of the present disclosure.

Various embodiments can be implemented, for example, using one or more computer systems, such as computer system 700 shown in FIG. 7. Computer system 700 can be any well-known computer capable of performing the functions described herein such as device 210 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 818 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to some embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

Figure 8:
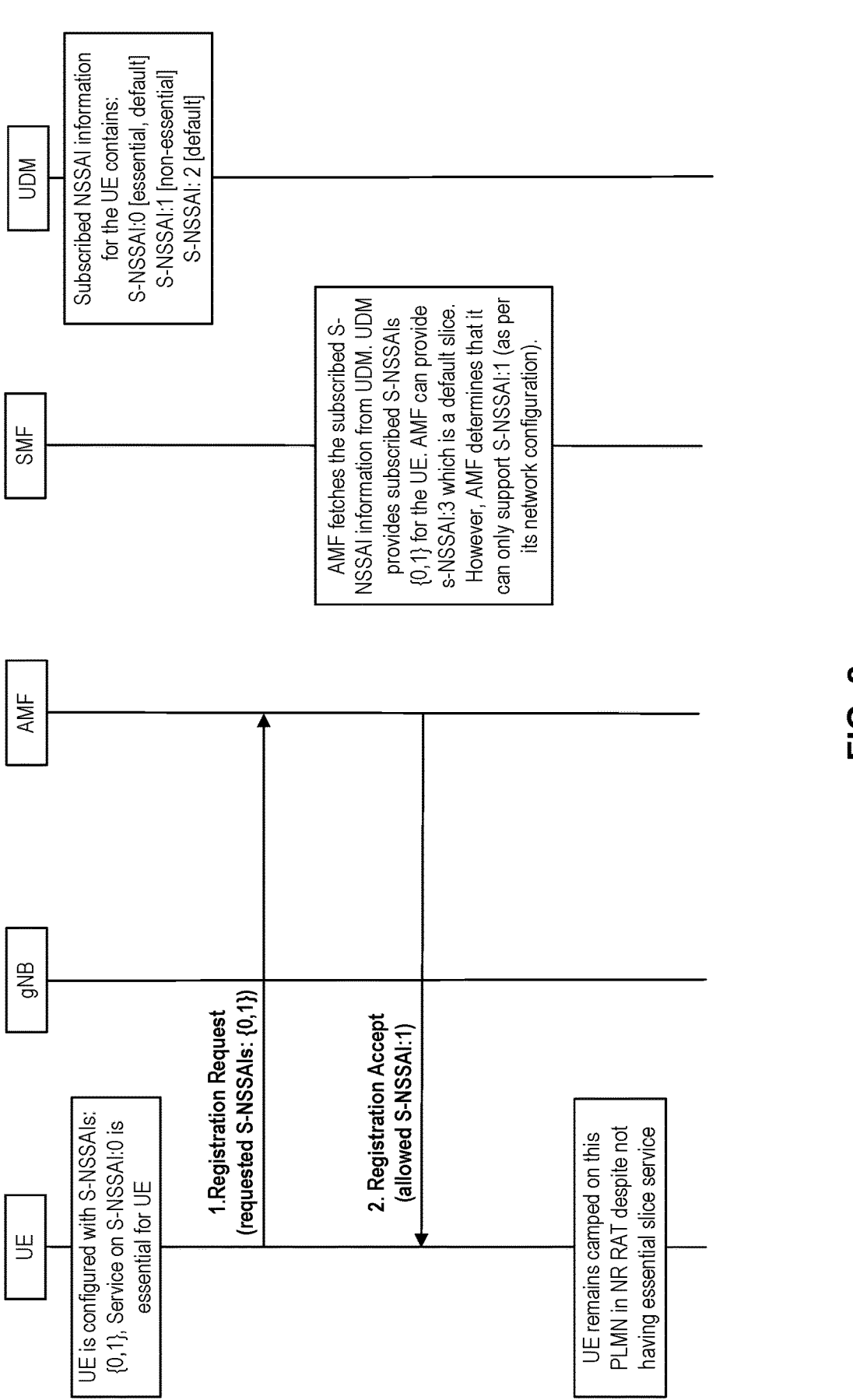
FIG. 8 illustrates an exemplary message flow diagram of a UE determining that essential slice service is not available according to aspects of the present disclosure.

FIGS. 8-14 illustrate various message flow diagrams detailing the aspects of the disclosure described herein. These figures illustrate messages exchanged between the UE, the gNB, the AMF, the Session Management Function (SMF), and the UDM. Specifically, FIG. 8 illustrates an exemplary message flow diagram of a UE determining that essential slice service is not available according to aspects of the present disclosure. According to aspects of the present disclosure, S-NSSAI:1 is considered non-essential.

Figure 9B:
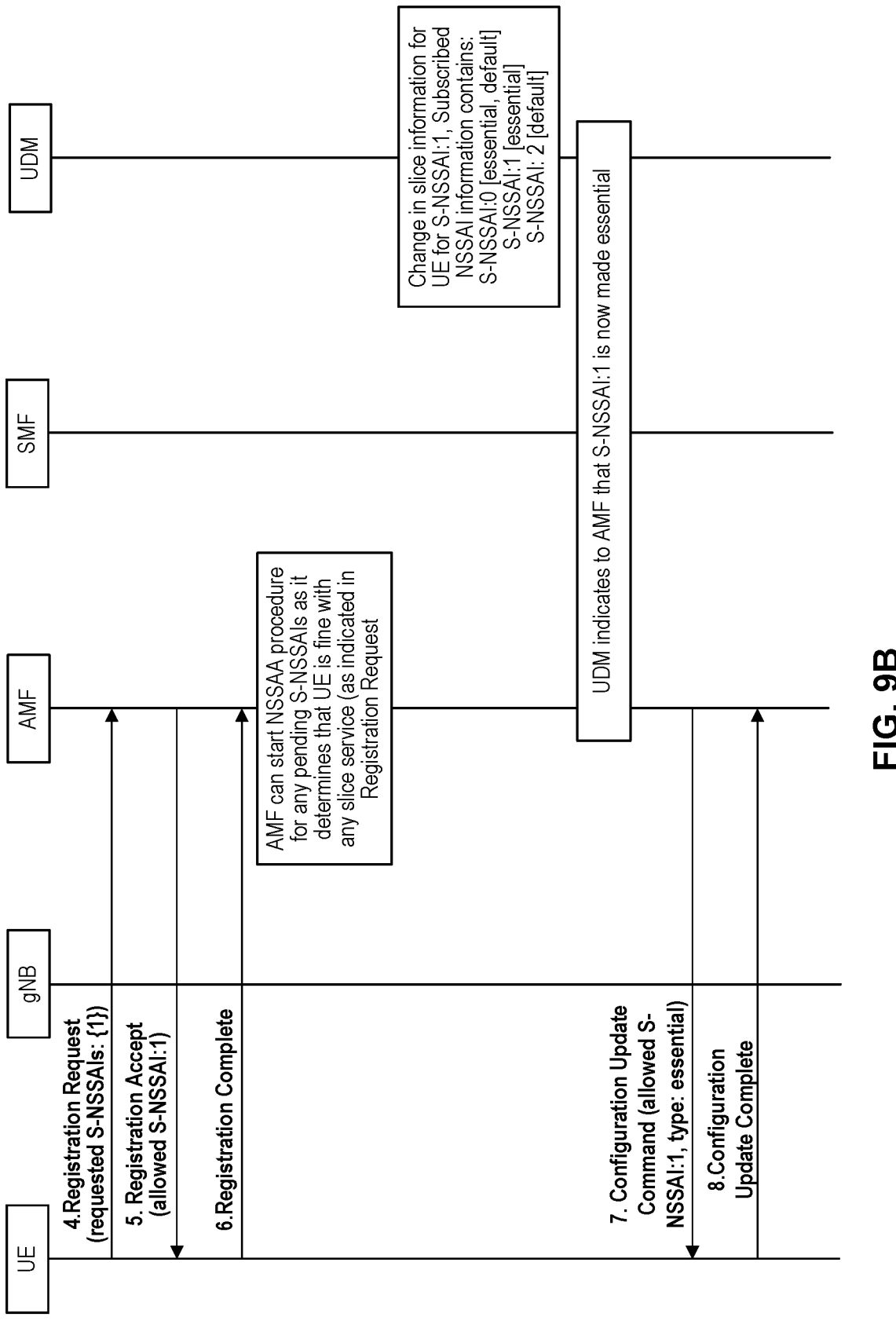

FIGS. 9A-9B illustrate an exemplary message flow diagram of a UE maintaining information about essential network slices according to aspects of the present disclosure. According to aspects of the present disclosure, S-NSSAI:0 is considered essential and S-NSSAI:1 is considered non-essential. Following step 1, the AMF fetches the subscribed S-NSSAI information from the UDM. The UDM provides subscribed S-NSSAIs {0,1} for the UE along with the information of which of the subscribed S-NSSAIs are essential. Following step 3, the UE determines that it has not received essential slice service (based on the slice configured information), so the UE can initiate a PLMN search to find essential slice service on other PLMNs. If the UE does not find other PLMNs and finally comes back to the original PLMN, then the UE initiates a Registration Request with no new type. At the same time, the AMF does not start Network Slice-Specific Authentication and Authorization (NSSAA) if any S-NSSAI is indicated pending in the Registration Accept message, if the UE has requested a registration type with "Essential slice service requested." Later in the message flow, the UDM changes the slice information for the UE, such that S-NSSAI:1 is identified as essential. The UDM then indicates to the AMF that S-NSSAI:1 is now essential.

According to further aspects of FIGS. 9A-9B, the essential type information for each S-NSSAI can be indicated in a DL NAS TRANSPORT message—"UE parameters update transparent container" (3GPP specification—24.501 section—5.4.5.3.3) containing the Default Configured S-NS-SAI. In Step 7, Essential type information for each S-NSSAI can be sent for configured S-NSSAI in a Configuration Update Command. Subsequent RRC connection establishment attempted by the UE will indicate the essential type information based on the NSSAI inclusion mode indicated in the Registration Accept message (3GPP specification section—4.6.2.3 & 5.5.1.2.4). The gNB will then select the appropriate AMF based on this information.

Figure 10B:
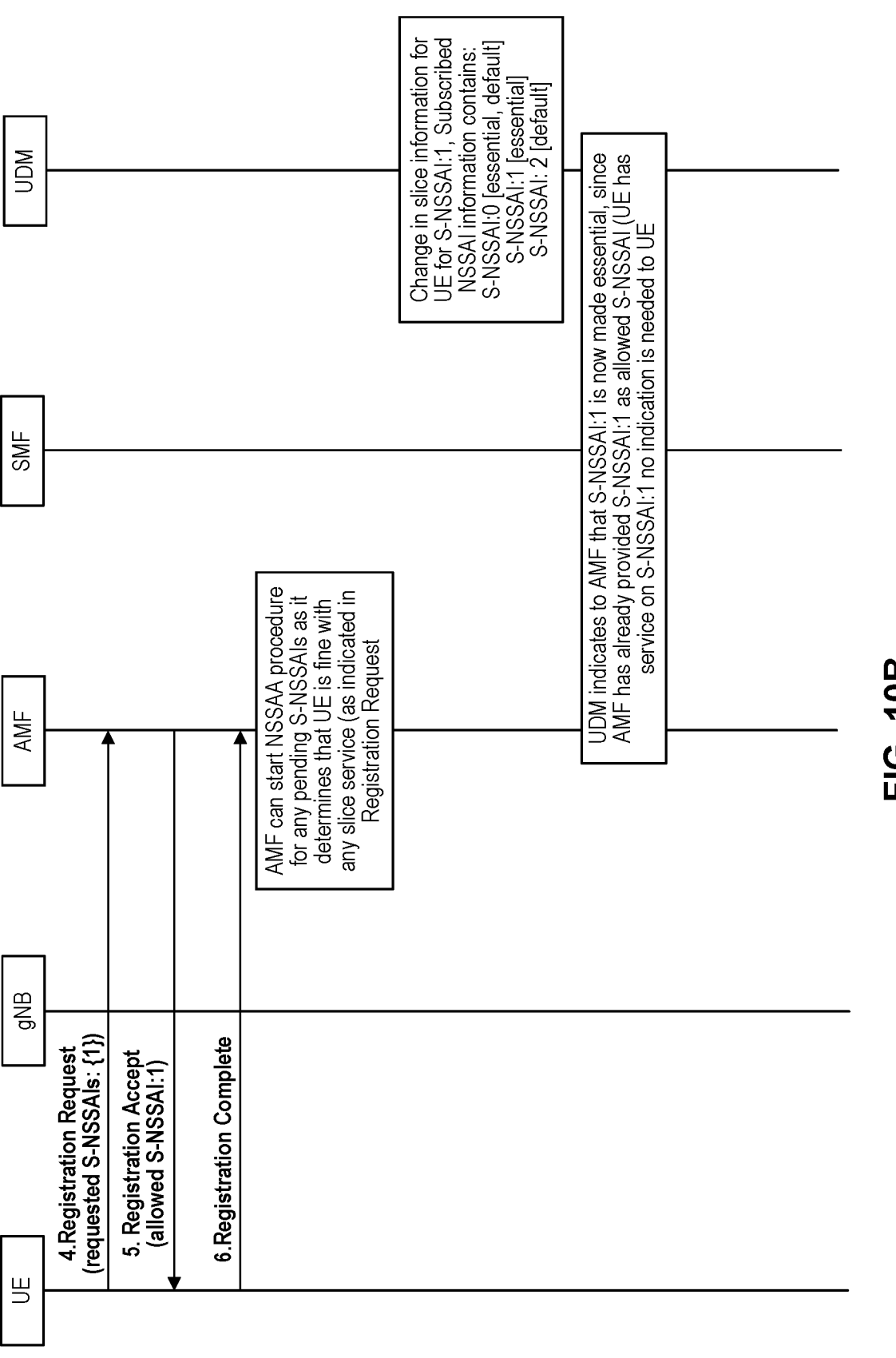

FIGS. 10A-10B illustrate an exemplary message flow diagram for requesting and searching for an essential network slice according to aspects of the present disclosure. According to aspects of the present disclosure, the UE is configured with S-NSSAIs {0,1} for this PLMN and the UE is unaware as to which S-NSSAI is essential. In addition to the aspects described above with respect to FIGS. 9A-9B, the UDM shown in FIG. 10B changes the slice information for the UE such that S-NSSAI:1 is labeled essential. The UDM then indicates to the AMF that S-NSSAI:1 is now made essential, since the AMF has already provided S-NS-SAI:1 as allowed S-NSSAI (e.g., the UE has service on S-NSSAI:1, so no indication is needed to the UE).

Figure 11A:
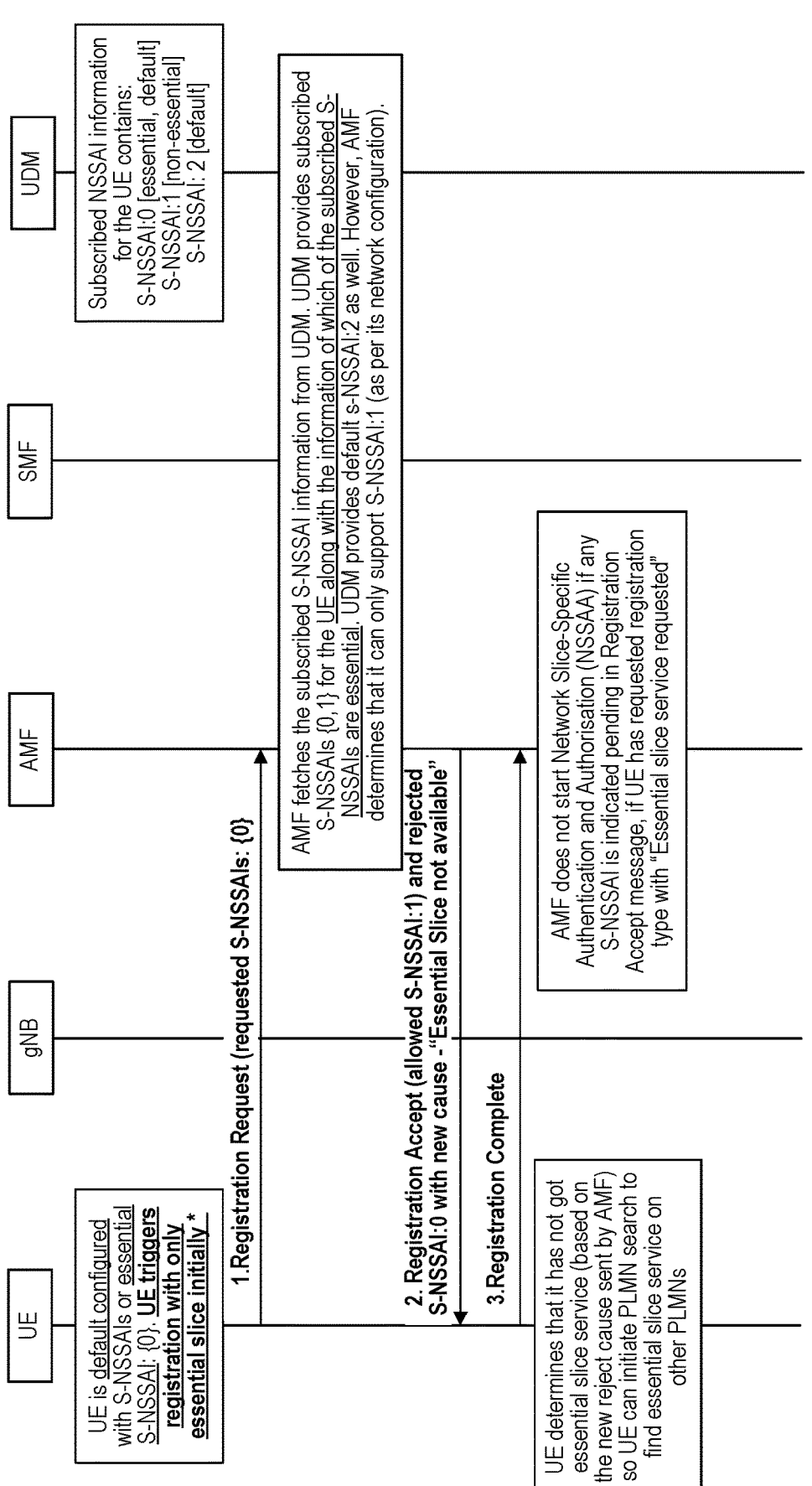
FIGS. 11A-11B illustrate an exemplary message flow diagram for maintaining information about essential network slices according to aspects of the present disclosure.
Figure 11B:
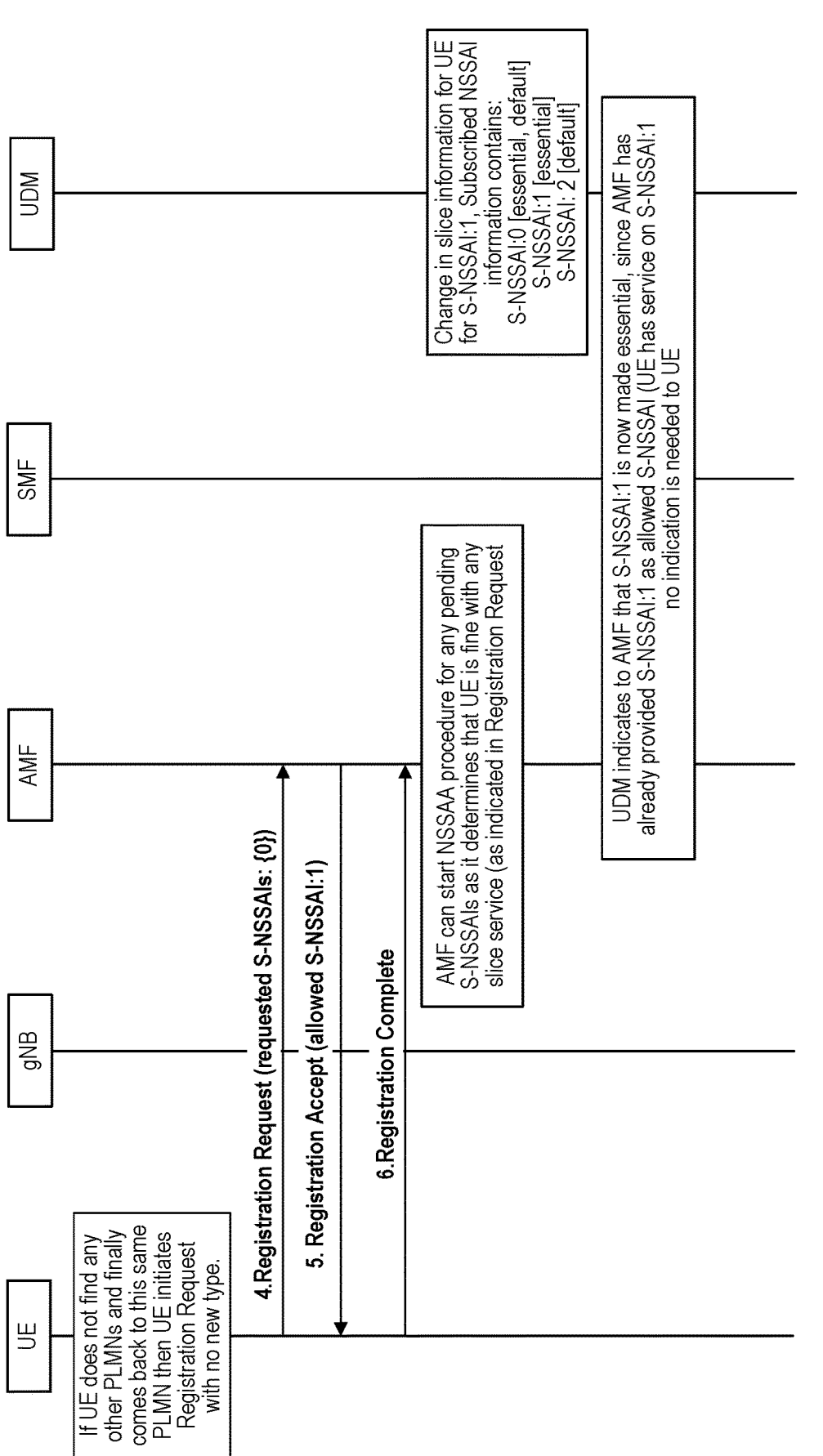

FIGS. 11A-11B illustrate an exemplary message flow diagram for maintaining information about essential network slices according to aspects of the present disclosure. According to aspects of FIGS. 11A-11B, the UE is default configured with S-NSSAIs or an essential S-NSSAI, and S-NSSAI:0 is considered essential. Advantageously, no new registration type is introduced. Further, it is more secure, since only the Home Network can update the default configured NSSAI (or essential NSSAI) in UE using the DL NAS TRANSPORT message with payload containing—"UE parameters update transparent" container. As a result, the exemplary message flow is very secure and no VPLMN can tamper with this information. As shown in Step 1, if there is no default configured slice (or essential slice configured in UE) then no S-NSSAI is sent in requested S-NSSAI. AMF determines after fetching from UDM which is the essential slice and in Registration Accept sends "allowed S-NSSAIs" which are accepted in network and can consequently send a DL NAS TRANSPORT message with payload containing—"UE parameters update transparent" container containing the essential slice information (if needed to update the UE).

According to further aspects of FIGS. 11A-11B, if S-NS-SAI:0 is not available then new cause—"Essential Slice not available" is sent to the UE to inform the UE that essential slice is not available. UE can then search for different PLMN if needed. Also other slices which are supported in network (default S-NSSAIs) can be sent as allowed S-NSSAIs in the REGISTRATION ACCEPT message or the CONFIGURA-TION UPDATE COMMAND. So UE can come to know that it can find service on slices other than the essential one if needed. After Step 1, if no requested S-NSSAI was sent (no essential S-NSSAI was present with UE) then after REGISTRATION ACCEPT, registered Network can configure essential S-NSSAI or default configured S-NSSAI (using DL NAS TRANSPORT message with payload containing—"UE parameters update transparent" container. After that the UE can then trigger a re-registration with the new essential slice information or perform PLMN search to find other suitable PLMNs. In RRC connection establishment same information of slice type as essential can be indicated to gNB.

FIG. 12 illustrates an exemplary message flow diagram for a UE determining that essential slice service is not available and initiating a PLMN search according to aspects of the present disclosure. According to aspects illustrated in FIG. 12, the UE is configured with S-NSSAIs: {0,1}, and the UE determines on its own that service on S-NSSAI:0 is essential to it. After step 2, the UE determines that it has not received essential S-NSSAI:0 service, and thus initiates a PLMN search and selection on its own. If no other PLMN is found, then the UE returns to the same PLMN and attempts re-registration if needed.

Figure 13:
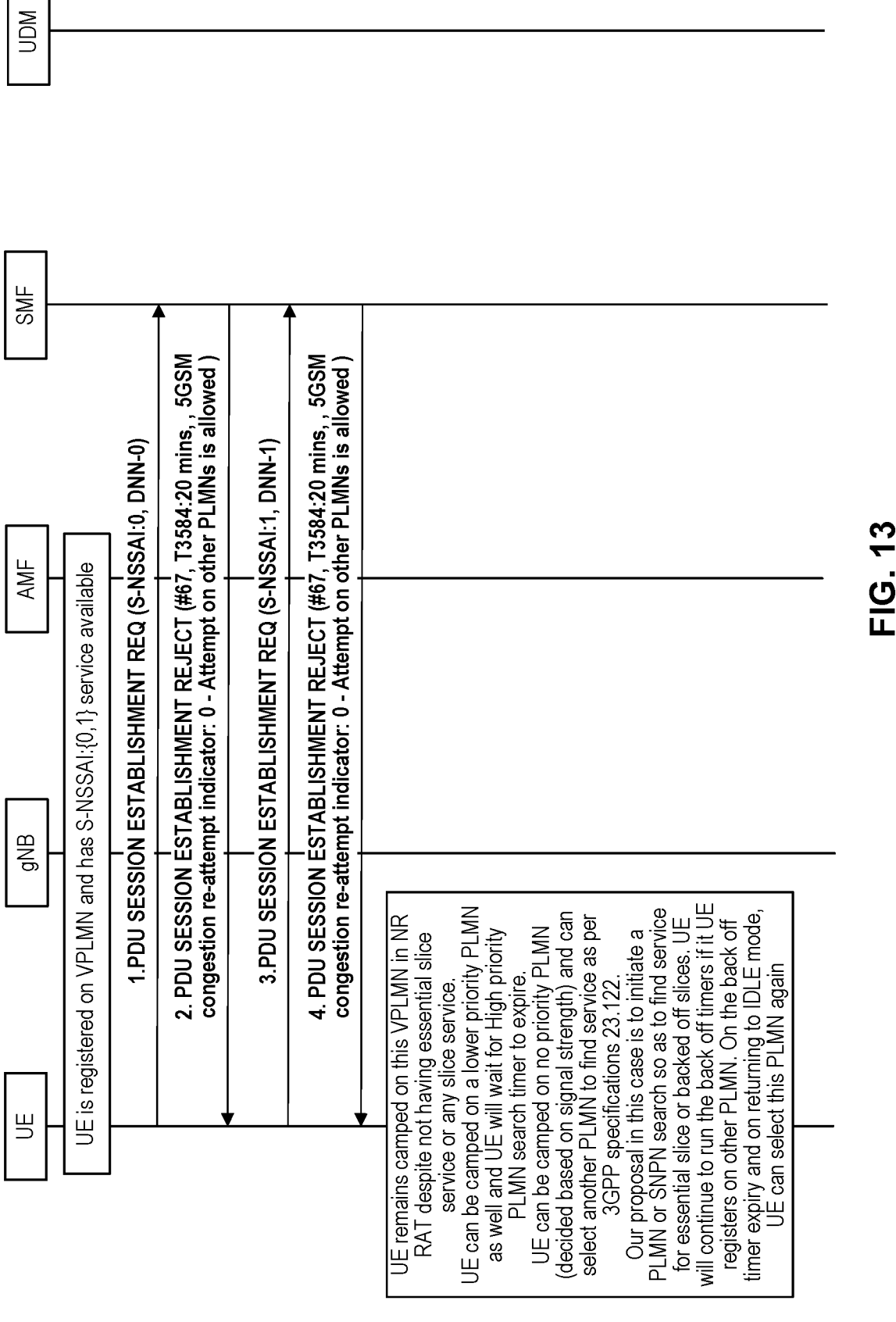
FIG. 13 illustrates an exemplary message flow diagram for a UE requesting backoff from one or more network slices for a camped PLMN according to aspects of the present disclosure.

FIG. 13 illustrates an exemplary message flow diagram for a UE requesting backoff from one or more network slices for a camped PLMN according to aspects of the present disclosure. According to aspects illustrated in FIG. 13, after step 4, the UE initiates a PLMN or SNPN search so as to find service for essential slice or backed off slices. The UE will continue to run the backoff timers if it registers on another PLMN. When the backoff timer expires, and the UE returns to IDLE mode, the UE can select the original PLMN again.

According to additional aspects of FIG. 13, messages 1 and 3 can be any UE initiated PDU session related messages—such as PDU SESSION MODIFICATION REQUEST (3GPP 24.501, section 6.4), then messages 2 and 4 will be PDU SESSION MODIFICATION REJECT. Network can also indicate backoff timers and 5GSM congestion re-attempt indicator in PDU SESSION RELEASE COMMAND. 3GPP specification 24.501, Section 6.2.8 discloses the detailed handling of the congestion cases in UE. For example, #67: insufficient resources for specific slice and DNN with T3584, and #69: insufficient resources for specific slice with T3585. According to aspects of this disclosure, a solution is proposed for the handling of these causes when the 5GSM congestion re-attempt indicator=0 (implying Attempt on other PLMNs is allowed). In Rel-17 3GPP specifications, more new causes can be applicable, and the UE can optionally perform a PLMN search once it determines all its combinations of DNN, S-NSSAI is exhausted.

Figure 14:
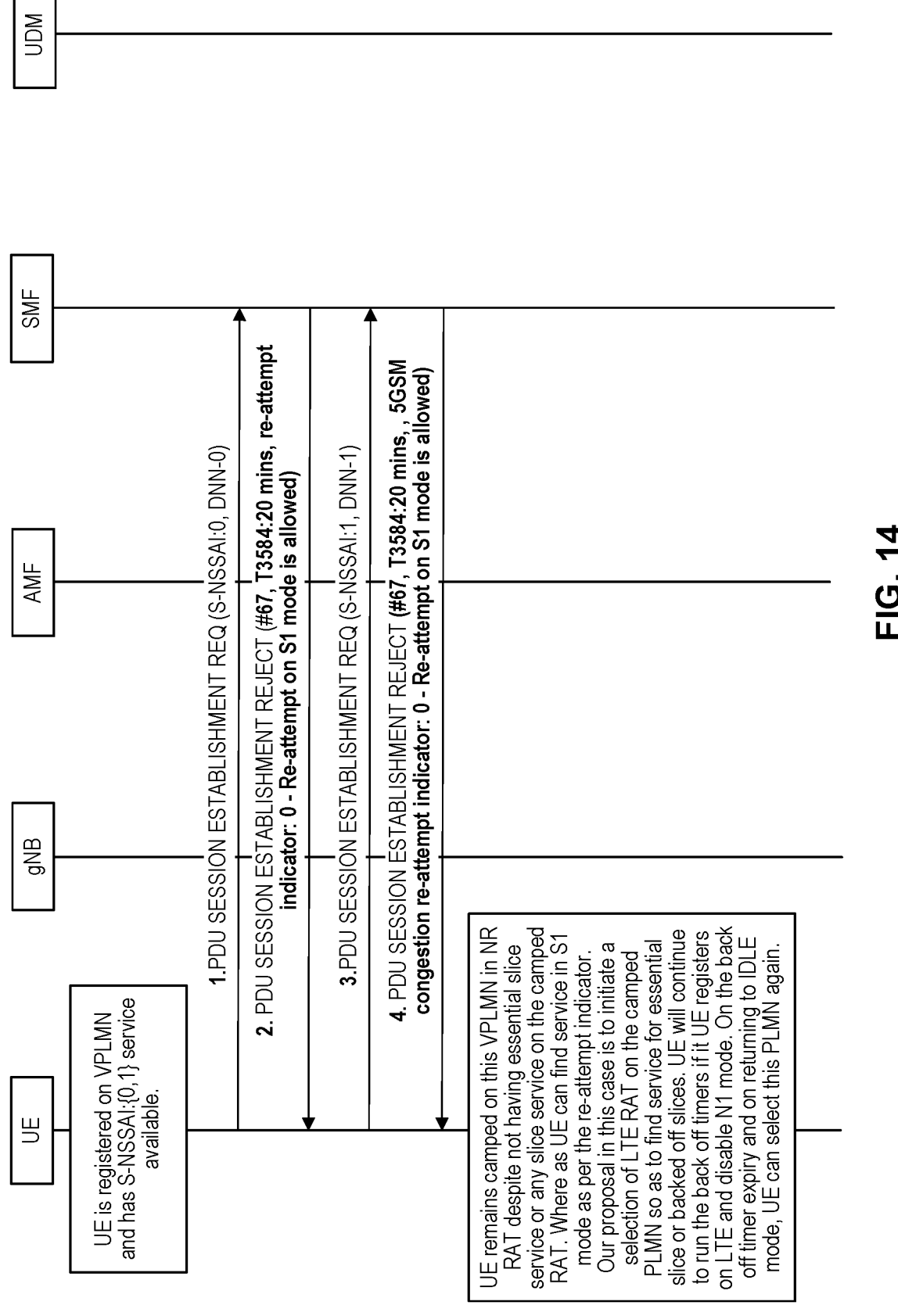
FIG. 14 illustrates an exemplary message flow diagram for a UE requesting backoff of one or more network slices for a camped radio access technology according to aspects of the present disclosure.

FIG. 14 illustrates an exemplary message flow diagram for a UE requesting backoff of one or more network slices for a camped radio access technology according to aspects of the present disclosure. According to aspects illustrated in FIG. 14, the UE initiates a selection of an LTE RAT on the camped PLMN in order to find service for an essential slice or backed off slices. The UE will continue to run the back off timers if the UE registers on LTE and disable N1 mode. On the back off timer expiration, and on returning to IDLE mode, the UE can select the original PLMN again.

According to further aspects of FIG. 14, messages 1 and 3 can be any UE initiated PDU session related messages—such as PDU SESSION MODIFICATION REQUEST (3GPP 24.501, section 6.4), then messages 2 and 4 will be PDU SESSION MODIFICATION REJECT. 3GPP specification 24.501, Section 6.4.2.4.3 have the detailed handling of the congestion cases in UE. For example, #26 "insufficient resources", #28 "unknown PDU session type", #39 "reactivation requested", #46 "out of LADN service area", #54 "PDU session does not exist", #67 "insufficient resources for specific slice and DNN", #68 "not supported SSC mode", or #69 "insufficient resources for specific slice". If the network does not provide re-attempt indicator, then the UE can decide whether it can re-attempt on S1 based on the configured value SM_RetryAtRATChange value as specified in 3GPP TS 24.368 [17] or in USIM file NASCONFIG. According to aspects of the present disclosure, a solution is proposed for handling of these causes when the re-attempt indicator=0 (implying Re-attempt on S1 mode allowed). In Rel-17 3GPP specifications, more new causes can be applicable and UE can optionally perform a PLMN search once it determines all its combinations of DNN, S-NSSAI is exhausted.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A user equipment (UE), comprising:
a transceiver configured to wirelessly communicate with a network; and
one or more processors configured to:
identify a plurality of network slices as essential based on at least one of a capability or a current functionality of the UE;
transmit, using the transceiver, a request message including an information bit that indicates that one or more essential services are requested without identifying the plurality of essential network slices;
receive a response message from the network indicating whether the plurality of essential network slices are supported by the network;
in response to the response message indicating that the network does not support the plurality of essential network slices sought by the UE or that the plurality of essential network slices are pending:
initiate a network search for a supporting network that supports the plurality of essential network slices based on the received response message; and
in response to the network search failing to locate a supporting network that supports all of the plurality of essential network slices, register with a network from among the searched networks that reported a maximum number of the plurality of essential network slices are supported; and
while registered and camped on the registered network, in response to determining that all Protocol Data Unit (PDU) sessions are backed off for an essential slice or that all combinations of Data Network Name/Single Network Slice Selection Assistance Information (DNN/S-NSSAI) are backed off for the essential slice, conduct a subsequent network search for the supporting network that supports all of the plurality of essential network slices.

2. The user equipment of claim 1, wherein the information bit is a single bit indicating whether essential services are requested.

3. The user equipment of claim 1, wherein the request message is a REGISTRATION REQUEST message, and wherein the response message is one of a REGISTRATION ACCEPT that indicates that the network is capable of servicing the essential network slice, or a REGISTRATION REJECT message.

4. The user equipment of claim 3, wherein the one or more processors are further configured to:
interpret the REGISTRATION REJECT message as indicating that the network is not capable of servicing the essential network slice,
wherein the network search is initiated in response to the REGISTRATION REJECT message.

5. The user equipment of claim 1, wherein the response message indicates, for each of the plurality of essential network slices associated with the user equipment, whether the corresponding essential network slice is supported by the network.

6. The user equipment of claim 1, wherein the one or more processors are configured to receive a CONFIGURATION UPDATE COMMAND that indicates a change in support for the essential slice.

7. The user equipment of claim 1, wherein the combinations of DNN/S-NSSAI comprise DNN and S-NSSAI, no DNN and S-NSSAI, DNN and no S-NSSAI, and no DNN and no S-NSSAI.

8. A method for seeking service for an essential network slice by a user equipment (UE), comprising:

identifying a plurality of network slices as essential based on at least one of a capability of or a current functionality of the UE;

transmitting a request message to a network that includes an information bit that indicates that one or more essential services are requested without identifying the plurality of essential network slices, the request message causing the network to retrieve essential slice information associated with the UE from a separate network element;

determining that the network does not support the plurality of essential network slices sought by the UE based on a received response message;

in response to the determining that the network does not support the plurality of essential network slices sought by the UE or that the plurality of essential network slices are pending:

initiating a search for a second network capable of supporting the plurality of essential network slices;

tracking a backoff timer during the search; and in response to the search failing to locate a supporting network that supports all of the plurality of essential network slices, register with a network from among the searched networks that reported a maximum number of the plurality of essential network slices are supported; and while registered and camped on the registered network, in response to determining that all Protocol Data Unit (PDU) sessions are backed off for an essential slice or that all combinations of Data Network Name/Single Network Slice Selection Assistance Information (DNN/ S-NSSAI) are backed off for the essential slice, conducting a subsequent network search for the supporting network that supports all of the plurality of essential network slices.

9. The method of claim 8, further comprising receiving the backoff timer from the network.

10. The method of claim 8, wherein the search is performed until the second network capable of supporting the plurality of essential network slices is found, or until the backoff timer expires.

11. The method of claim 10, further comprising re-registering with the network in response to the expiration of the backoff timer.

12. The method of claim 8, wherein the separate network element is a User Data Management (UDM) function.

13. The method of claim 8, wherein the received response message is received from the network and indicates, for each essential network slice associated with the UE, whether the corresponding essential network slice is supported by the network.

14. A method for seeking service for a plurality of essential network slices, the method comprising:

identifying the plurality of essential network slices based on at least one of a capability of or current functionality of a user equipment (UE);

transmitting a request message to a network that includes an information bit that indicates that one or more essential services are requested without identifying the plurality of essential network slices, the request message causing the network to retrieve essential slice information associated with the UE from a separate network element;

receiving a response message from the network indicating whether the plurality of essential network slices are supported by the network;

in response to the response message indicating that the network does not support the plurality of essential network slices sought by the UE or that the plurality of essential network slices are pending:

initiating a network search for a supporting network that supports the plurality of essential network slice based on the received response message; and in response to the network search failing to locate a supporting network that supports all of the plurality of essential network slices, registering with a network from among the searched networks that reported a maximum number of the plurality of essential network slices are supported; and while registered and camped on the registered network, in response to determining that all Protocol Data Unit (PDU) sessions are backed off for an essential slice or that all combinations of Data Network Name/Single Network Slice Selection Assistance Information (DNN/ S-NSSAI) are backed off for the essential slice, conducting a subsequent network search for thes supporting network that supports all of the plurality of essential network slices.

15. The method of claim 14, wherein the information bit is a single bit indicating whether essential services are requested.

16. The method of claim 14, wherein the request message is a REGISTRATION REQUEST message, and wherein the response message is one of a REGISTRATION ACCEPT that indicates that the network is capable of servicing the essential network slice, or a REGISTRATION REJECT message.

17. The method of claim 14, wherein the separate network element is a User Data Management (UDM) function.

18. The method of claim 14, further comprising interpreting the REGISTRATION REJECT message as indicating that the network is not capable of servicing the plurality of essential network slices, wherein the network search is initiated in response to the REGISTRATION REJECT message.

19. The method of claim 14, wherein the response message indicates, for each of the plurality of essential network slices associated with the user equipment, whether the corresponding essential network slice is supported by the network.

20. The method of claim 14, further comprising receiving a CONFIGURATION UPDATE COMMAND that indicates a change in support for the essential slice.

* * * * *